(12) United States Patent
Gao et al.

(10) Patent No.: US 12,726,310 B2
(45) Date of Patent: Sep. 1, 2026

(54) SYSTEMS AND METHODS FOR SIGNALING PATHLOSS REFERENCE RS

(71) Applicant: Telefonaktiebolaget LM Ericsson (publ), Stockholm (SE)

(72) Inventors: Shiwei Gao, Nepean (CA); Helka-Liina Määttänen, Espoo (FI); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 18/285,333

(22) PCT Filed: Apr. 4, 2022

(86) PCT No.: PCT/IB2022/053124
§ 371 (c)(1),
(2) Date: Oct. 2, 2023

(87) PCT Pub. No.: WO2022/208486
PCT Pub. Date: Oct. 6, 2022

(65) Prior Publication Data
US 2024/0178965 A1 May 30, 2024

Related U.S. Application Data

(60) Provisional application No. 63/169,969, filed on Apr. 2, 2021.

(51) Int. Cl.
*H04L 5/00* (2006.01)

(52) U.S. Cl.
CPC .......... *H04L 5/0051* (2013.01); *H04L 5/0091* (2013.01)

(58) Field of Classification Search
CPC ............................ H04L 5/0051; H04L 5/0091
See application file for complete search history.

(56) References Cited

U.S. PATENT DOCUMENTS

2020/0112970 A1* 4/2020 Manolakos ........... H04L 5/0064
2021/0153238 A1* 5/2021 Zhou .................. H04L 25/0226
(Continued)

OTHER PUBLICATIONS

Author Unknown, "Technical Specification Group Radio Access Network; Evolved Universal Terrestrial Radio Access (E-UTRA); Medium Access Control (MAC) protocol specification (Release 16)," Technical Specification 36.321, Version 16.4.0, Mar. 2021, 3GPP Organizational Partners, 142 pages.
(Continued)

*Primary Examiner* — Fahmida S Chowdhury
(74) *Attorney, Agent, or Firm* — Sonoda & Kobayashi Intellectual Property Law; Sarvajit S. Patil

(57) ABSTRACT

Systems and methods for signaling Pathloss Reference RS are provided. In some embodiments, a method performed by a wireless device for identifying which Transmission and Reception Point (TRP) an update refers to includes: receiving a configuration of a first and second Sounding Reference Signal (SRS) resource sets associated to a first and second TRP; receiving a control message indicating a Physical Uplink Shared Channel (PUSCH) pathloss reference update; where the control message comprises an indication of which TRP the update refers to. In some embodiments: the control message comprises a Medium Access Control (MAC) Control Element (CE); the pathloss reference update comprises a PUSCH Pathloss Reference Signal (RS) ID field; the pathloss reference update comprises one or more SRS Resource Indicator (SRI) ID fields. In this way, pathloss can be updated for SRIs associated with different SRS resource sets for per TRP power control in PUSCH repetition to multiple TRP.

17 Claims, 17 Drawing Sheets

| | | | | | | | | |
|---|---|---|---|---|---|---|---|---|
| R | Service Cell ID (5bits) | | | | | BWP ID (2bits) | | OCT 1 |
| R | C | PUSCH Pathloss Reference RS ID (6bits) | | | | | | OCT 2 |
| R | R | PUSCH Pathloss Reference RS ID 2 (6bits) | | | | | | OCT 3 |
| SRI $ID_0$ | | | | SRI $ID_1$ | | | | OCT 4 |

...

| | | |
|---|---|---|
| SRI $ID_{2N-6}$ | SRI $ID_{2N-5}$ | OCT N |

(56) References Cited

U.S. PATENT DOCUMENTS

2022/0312337 A1* 9/2022 Lim .................... H04W 52/242
2022/0321289 A1* 10/2022 Sun ........................ H04B 7/068
2023/0067031 A1* 3/2023 Grossmann ........... H04L 5/0051
2023/0127731 A1* 4/2023 Yuan ..................... H04L 5/0044
370/329
2023/0133979 A1* 5/2023 Sun ....................... H04W 72/20
370/329
2023/0156485 A1* 5/2023 Zhang .................. H04W 16/28
370/329
2023/0189250 A1* 6/2023 Go ...................... H04W 52/146
2023/0209567 A1* 6/2023 Grossmann ........... H04L 5/0051
370/329
2023/0275728 A1* 8/2023 Chung .................. H04W 52/42
370/329
2023/0370219 A1* 11/2023 Ling ..................... H04L 5/0053
2023/0379108 A1* 11/2023 Grossmann ........... H04L 5/0048
2023/0397121 A1* 12/2023 Matsumura ........... H04W 52/04
2024/0178965 A1* 5/2024 Gao ...................... H04L 5/0091
2024/0314704 A1* 9/2024 Li ....................... H04W 52/146

OTHER PUBLICATIONS

Author Unknown, “Technical Specification Group Radio Access Network; NR; User Equipment (UE) radio transmission and reception; Part 1: Range 1 Standalone (Release 17),” Technical Specification 38.101-1, Version 17.0.0, Dec. 2020, 3GPP Organizational Partners, 488 pages.

Author Unknown, “Technical Specification Group Radio Access Network; NR; User Equipment (UE) radio transmission and reception; Part 2: Range 2 Standalone (Release 17),” Technical Specification 38.101-2, Version 17.0.0, Dec. 2020, 3GPP Organizational Partners, 180 pages.

Author Unknown, “Technical Specification Group Radio Access Network; NR; User Equipment (UE) radio transmission and reception; Part 3: Range 1 and Range 2 Interworking operation with other radios (Release 17),” Technical Specification 38.101-3, Version 17.0.0, Dec. 2020, 3GPP Organizational Partners, 667 pages.

Author Unknown, “Technical Specification Group Radio Access Network; NR; Multiplexing and channel coding (Release 16),” Technical Specification 38.212, Version 16.5.0, Mar. 2021, 3GPP Organizational Partners, 152 pages.

Author Unknown, “Technical Specification Group Radio Access Network; NR; Medium Access Control (MAC) protocol specification (Release 16),” Technical Specification 38.321, Version 16.3.0, Dec. 2020, 3GPP Organizational Partners, 156 pages.

Author Unknown, “Technical Specification Group Radio Access Network; NR; Radio Resource Control (RRC) protocol specification (Release 16),” Technical Specification 38.331, Version 16.3.0, Dec. 2020, 3GPP Organizational Partners, 932 pages.

ZTE, “R1-2100286: Enhancements on Multi-TRP for PDCCH, PUCCH, and PUSCH,” 3GPP TSG RAN WG1 Meeting #104-e, Jan. 25-Feb. 5, 2021, Electronic Meeting, 25 pages.

International Search Report and Written Opinion for International Patent Application No. PCT/IB2022/053124, mailed Jun. 20, 2022, 13 pages.

* cited by examiner

SYSTEMS AND METHODS FOR SIGNALING PATHLOSS REFERENCE RS

RELATED APPLICATIONS

This application is a 35 U.S.C. § 371 national phase filing of International Application No. PCT/IB2022/053124, filed Apr. 4, 2022, which claims the benefit of provisional patent application Ser. No. 63/169,969, filed Apr. 2, 2021, the disclosures of which are hereby incorporated herein by reference in their entireties.

TECHNICAL FIELD

The disclosure relates generally to signaling pathloss reference RS.

BACKGROUND

In NR, two transmission schemes for Physical Uplink Shared Channel (PUSCH) are supported. One is codebook based and the other is non-codebook based. Codebook based PUSCH transmission scheme can be summarized as follows:

- the UE transmits Sounding Reference Signal (SRS) in an SRS resource set with a higher layer parameter usage set to 'CodeBook'. Up to two SRS resources, each with up to four antenna ports can be configured in the SRS resource set.
- the gNB determines a SRS resource and a number of Multiple Input and Multiple Output (MIMO) layers (or rank) and a preferred precoder (i.e., Transmit Precoding Matrix Indicator (TPMI)) associated with the SRS resource.
- the gNB indicates the selected SRS resource via a 1-bit 'SRS resource indicator' (SRI) field in a Downlink Control Information (DCI) format (e.g., DCI format 0_1 or DCI format 0_2) scheduling the PUSCH if two SRS resources are configured in the SRS resource set. The 'SRS resource indicator' field is not present in DCI if only one SRS resource is configured in the SRS resource set.
- The gNB indicates the preferred TPMI and the associated number of layers for the PUSCH transmission over a set of antenna ports of the indicated SRS resource.
- the UE performs PUSCH transmission using the TPMI and the number of layers indicated over the set of antenna ports.

Non-Codebook based UL transmission is for reciprocity-based UL transmission in which SRS precoding over a set of physical antenna ports is derived at a UE based on a configured DL Channel State Information Reference Signal (CSI-RS). The UE derives a suitable precoder for SRS transmission based on the CSI-RS and creates one or more (virtual) SRS ports, each corresponding to a spatial layer. Up to four SRS resources, each with a single (virtual) SRS port can be configured in a SRS resource set. A UE can transmit SRS in the up to four SRS resources and the gNB measures UL channel based on the received SRS and determines the preferred SRS resource(s). Subsequently, the gNB indicates the selected SRS resources via a SRS resource indicator (SRI) in a DCI format scheduling a PUSCH.

Note that up to Rel-16 in NR, only a single SRS resource set can be configured with usage set to "noncodebook" or "codebook".

NR Rel-15/Rel-16 Power Control for PUSCH

Uplink power control is used to determine a proper PUSCH transmit power. The uplink power control in NR consists of two parts, i.e., open-loop and closed-loop power adjustments. Open-loop power adjustment is determined by a UE and is used to set the uplink transmit power based on a pathloss estimation and some other factors such as target receive power, scheduled bandwidth, Modulation and Coding Scheme (MCS), fractional power control factor, etc. Closed-loop power adjustment is based on PUSCH Transmit Power Control (TPC) commands received from the gNB.

With multi-beam transmission in NR Frequency Range 2 (FR2), the pathloss can be different with different transmit and receive beam pairs. To support transmission with different beam pairs, each beam pair can be associated with a Reference Signal (RS). Pathloss associated with a beam pair can be measured based on the associated RS, also referred to a pathloss reference RS. A pathloss reference RS can be a Synchronization Signal (SS) and Physical Broadcast Channel (PBCH) block (SSB) or a CSI-RS.

FIG. 1 shows an example, in which for PUSCH transmitted in beam #1 from a transmission/Reception Point (TRP), CSI-RS #1 may be configured as the pathloss reference RS. Similarly, for PUSCH transmitted in beam #2 from the same TRP, CSI-RS #2 may be configured as the pathloss RS.

For a PUSCH to be transmitted in a UL beam pair associated with a pathloss reference RS with index k, its transmit power in a transmission occasion i within a slot in a bandwidth part (BWP) of a carrier frequency of a serving cell and a closed-loop index l (l=0,1) can be determined as $$P(i,k,l) = \min\begin{cases} P_{CMAX}(i) \\ P_{open-loop}(i,k) + P_{closed-loop}(i,l) \end{cases}$$

where $P_{CMAX}(i)$ is a configured UE maximum output power defined in 3GPP TS 38.101-1, TS38.101-2 and TS38.101-3 for the carrier frequency of the serving cell in transmission occasion i according to; $P_{closed-loop}(i, l)$ is the closed loop power adjustment; $P_{open-loop}(i, k)$ is the open loop power adjustment and is given by, $$P_{open-loop}(i,k)=P_O+P_{RB}(i)+\alpha PL(k)+\Delta_{MCS}(i)$$

where $P_O$ is the nominal target receive power and comprises a cell specific part $P_{O,nominal\_PUSCH}$ and a UE specific part $P_{O,UE\_PUSCH}$, $P_{RB}(i)$ is a power adjustment related to the number of resource blocks (RBs) scheduled for the PUSCH in a transmission occasion i,PL(k) is a pathloss estimation based on the pathloss reference RS with index k, a is a fractional pathloss compensation factor, and $\Delta_{MCS}(i)$ is a power adjustment related to MCS.

For dynamically scheduled PUSCH, $P_{O,UE\_PUSCH}$, $\alpha$ and PL(k) are dependent on the associated SRS resource indicated in a DCI scheduling the PUSCH as illustrated in FIG. 2. When a UE is indicated with a SRI in a DCI format, the SRI is also used to identify a set of PUSCH power control parameters, including a PUSCH pathloss reference RS ID, $P_{O,UE\_PUSCH}$, $\alpha$, and a closed-loop index from a list of PUSCH pathloss reference RS IDs, a list of $P_{O,UE\_PUSCH}$ and a sets, and a list of closed-loop indices.

The lists of PUSCH pathloss reference RS IDS, $P_{O,UE\_PUSCH}$ and $\alpha$ sets, and closed-loop indices are configured by higher layers in a PUSCH-PowerControl information element (IE) shown below:

PUSCH-PowerControl information element (reproduced from section 6.3.2 of 3GPP TS 38.331 v16.3.0)

```
-- ASN1START
-- TAG-PUSCH-POWERCONTROL-START
PUSCH-PowerControl ::=                  SEQUENCE {
    tpc-Accumulation                      ENUMERATED { disabled }    OPTIONAL, --
Need S
    msg3-Alpha                            Alpha                      OPTIONAL, --
Need S
    p0-NominalWithoutGrant                INTEGER (-202..24)         OPTIONAL, --
Need M
    p0-AlphaSets                          SEQUENCE (SIZE (1..maxNrofP0-PUSCH-
AlphaSets)) OF P0-PUSCH-AlphaSet     OPTIONAL, -- Need M
    pathlossReferenceRSToAddModList       SEQUENCE (SIZE (1..maxNrofPUSCH-
PathlossReferenceRSs)) OF PUSCH-PathlossReferenceRS
OPTIONAL, -- Need N
    pathlossReferenceRSToReleaseList      SEQUENCE (SIZE (1..maxNrofPUSCH-
PathlossReferenceRSs)) OF PUSCH-PathlossReferenceRS-Id
OPTIONAL, -- Need N
    twoPUSCH-PC-AdjustmentStates          ENUMERATED {twoStates}     OPTIONAL, --
Need S
    deltaMCS                              ENUMERATED {enabled}       OPTIONAL, --
Need S
    sri-PUSCH-MappingToAddModList         SEQUENCE (SIZE (1..maxNrofSRI-PUSCH-
Mappings)) OF SRI-PUSCH-PowerControl
OPTIONAL, -- Need N
    sri-PUSCH-MappingToReleaseList        SEQUENCE (SIZE (1..maxNrofSRI-PUSCH-
Mappings)) OF SRI-PUSCH-PowerControlId
OPTIONAL -- Need N
}
P0-PUSCH-AlphaSet ::=                   SEQUENCE {
    p0-PUSCH-AlphaSetId                   P0-PUSCH-AlphaSetId,
    p0                                    INTEGER (-16..15)          OPTIONAL, --
Need S
    alpha                                 Alpha                      OPTIONAL --
Need S
}
P0-PUSCH-AlphaSetId ::=                 INTEGER (0..maxNrofP0-PUSCH-AlphaSets-1)
PUSCH-PathlossReferenceRS ::=           SEQUENCE {
    pusch-PathlossReferenceRS-Id          PUSCH-PathlossReferenceRS-Id,
    referenceSignal                       CHOICE {
      ssb-Index                             SSB-Index,
      csi-RS-Index                          NZP-CSI-RS-ResourceId
    }
}
PUSCH-PathlossReferenceRS-r16 ::=       SEQUENCE {
    pusch-PathlossReferenceRS-Id-r16      PUSCH-PathlossReferenceRS-Id-v1610,
    referenceSignal-r16                   CHOICE {
      ssb-Index-r16                         SSB-Index,
      csi-RS-Index-r16                      NZP-CSI-RS-ResourceId
    }
}
PUSCH-PathlossReferenceRS-Id ::=        INTEGER (0..maxNrofPUSCH-
PathlossReferenceRSs-1)
PUSCH-PathlossReferenceRS-Id-v1610 ::= INTEGER (maxNrofPUSCH-
PathlossReferenceRSs..maxNrofPUSCH-PathlossReferenceRSs-1-r16)
SRI-PUSCH-PowerControl ::=              SEQUENCE {
    sri-PUSCH-PowerControlId              SRI-PUSCH-PowerControlId,
    sri-PUSCH-PathlossReferenceRS-Id      PUSCH-PathlossReferenceRS-Id,
    sri-P0-PUSCH-AlphaSetId               P0-PUSCH-AlphaSetId,
    sri-PUSCH-ClosedLoopIndex             ENUMERATED { i0, i1 }
}
SRI-PUSCH-PowerControlId ::=            INTEGER (0..maxNrofSRI-PUSCH-Mappings-1)
PUSCH-PowerControl-v1610 ::=            SEQUENCE {
    pathlossReferenceRSToAddModList2-r16 SEQUENCE (SIZE (1..maxNrofPUSCH-
PathlossReferenceRSsDiff-r16)) OF PUSCH-PathlossReferenceRS-r16
  OPTIONAL, -- Need N
    pathlossReferenceRSToReleaseList2-r16 SEQUENCE (SIZE (1..maxNrofPUSCH-
PathlossReferenceRSsDiff-r16)) OF PUSCH-PathlossReferenceRS-Id-v1610
  OPTIONAL, -- Need N
    p0-PUSCH-SetList-r16                  SEQUENCE (SIZE (1..maxNrofSRI-PUSCH-
Mappings)) OF P0-PUSCH-Set-r16
  OPTIONAL, -- Need R
    olpc-ParameterSet                     SEQUENCE {
      olpc-ParameterSetDCI-0-1-r16          INTEGER (1..2)
OPTIONAL, -- Need R
      olpc-ParameterSetDCI-0-2-r16          INTEGER (1..2)
OPTIONAL -- Need R
    }
OPTIONAL, -- Need M
```

-continued

PUSCH-PowerControl information element (reproduced from section 6.3.2 of 3GPP TS 38.331 v16.3.0)

```
    ...
}
P0-PUSCH-Set-r16 ::=                SEQUENCE {
    p0-PUSCH-SetId-r16                  P0-PUSCH-SetId-r16,
    p0-List-r16                         SEQUENCE (SIZE (1..maxNrofP0-PUSCH-
Set-r16)) OF P0-PUSCH-r16
  OPTIONAL, -- Need R
    ...
}
P0-PUSCH-SetId-r16 ::=              INTEGER (0..maxNrofSRI-PUSCH-Mappings-1)
P0-PUSCH-r16 ::=                    INTEGER (−16..15)
-- TAG-PUSCH-POWERCONTROL-STOP
-- ASN1STOP
.
```

PUSCH pathloss reference RS ID associated with one or more SRIs can be updated by Medium Access Control (MAC) Control Element (CE) as shown FIG. 3.

As specified in 3GPP TS 38.321, the MAC CE in FIG. 3 has variable size and consists of the following fields:

- Serving Cell ID: This field indicates the identity of the Serving Cell, which contains activated PUSCH Pathloss Reference RS. The length of the field is 5 bits;
- BWP ID: This field indicates a UL BWP as the codepoint of the DCI bandwidth part indicator field as specified in 3GPP TS 38.212, which contains activated PUSCH Pathloss Reference RS. The length of the field is 2 bits;
- PUSCH Pathloss Reference RS ID: This field indicates the PUSCH Pathloss Reference RS ID identified by PUSCH-PathlossReferenceRS-Id as specified in 3GPP TS 38.331, which is to be updated in the SRI PUSCH power control mappings indicated by SRI ID fields indicated in the same MAC CE. The length of the field is 6 bits;
- C: This field indicates the presence of the additional SRI ID in the last octet of this MAC CE. If this field is set to 1, two SRI ID(s) are present in the last octet. Otherwise only one SRI ID (i.e., the first SRI ID) is present in the last octet;
- SRI ID: This field indicates the SRI PUSCH power control ID identified by sri-PUSCH-PowerControlId as specified in TS 38.331 [5]. The length of the field is 4 bits;
- R: Reserved bit, set to 0

NR Rel-17 Enhancements for PUSCH Transmission Towards Two TRPs

In NR Rel-17, it has been agreed that PUSCH repetition to two TRPs will be supported. For that purpose, two SRS resource sets with usage set to either ‘codebook’ or ‘nonCodebook’ will be introduced, each SRS resource set is associated with a TRP. PUSCH repetition to two TRPs can be scheduled by a DCI format with two SRS resource indicators (SRIs), where a first SRI is associated with a first SRS resource set and a second SRI is associated with a second SRS resource set.

An example is shown in FIG. 5, where two PUSCH repetitions towards two TRPs are scheduled by a DCI format indicating two SRIs.

There currently exist certain challenge(s). For PUSCH transmission to multiple TRPs, there would be an ambiguity with the existing MAC CE for PUSCH pathloss reference RS ID update as the UE does not know which TRP the existing MAC CE updates the PUSCH pathloss reference RS ID.

SUMMARY

Systems and methods for signaling Pathloss Reference RS are provided. In some embodiments, a method performed by a wireless device for identifying which Transmission and Reception Point (TRP) of a first and a second TRP an update refers to includes: receiving a configuration of a first and a second Sounding Reference Signal (SRS) resource sets, associated to the first and the second TRPs, respectively; receiving a control message indicating a Physical Uplink Shared Channel (PUSCH) pathloss reference update associated to one of the first and the second SRS resource sets; where the control message comprises an indication of which TRP of the plurality of TRPs the pathloss reference update refers to. In some embodiments, the control message comprises a Medium Access Control (MAC) Control Element (CE). In some embodiments, the pathloss reference update comprises a PUSCH Pathloss Reference Signal (RS) ID field. In some embodiments, the pathloss reference update comprises one or more SRS Resource Indicator (SRI) ID fields. In this way, pathloss can be updates for SRIs associated with different SRS resource sets for per TRP power control in PUSCH repetition to multiple TRPs.

In some embodiments, a new MAC CE is proposed with a new field to indicate one of two SRS resource sets, one of two sri-PUSCH-MappingToAddModLists, or one of two sri-PUSCH-PathlossReferenceRS-Ids the SRI ID fields or the PUSCH Pathloss Reference RS ID field in the MAC CE are associated with.

As an alternative the existing MAC CE “6.1.3.28 PUSCH Pathloss Reference RS Update MAC CE” in 3GPP TS 38.321 is used with one of the R fields to indicate one of two SRS resource sets, one of two sri-PUSCH-MappingToAddModLists, or one of two sri-PUSCH-PathlossReferenceRS-Ids the SRI ID fields or the PUSCH Pathloss Reference RS ID field in the MAC CE are associated with. Depending on the RRC implementation, there are different MAC CE variants that update the existing MAC CE to support this.

As a yet alternative set of embodiments are new MAC CE options where one MAC CE updates both SRI ID to pathloss reference RS mappings associated to both SRS resource sets. A new field indicating a SRS resource set is introduced in MAC CE for PUSCH pathloss RS update when two SRS resource sets are configured for PUSCH transmissions to multiple TRPs.

In some embodiments, a method performed by a base station for identifying which TRP of a plurality of TRPs an update refers to, the method comprising: transmitting a control message indicating a pathloss reference update; where the control message comprises an indication of which TRP of the plurality of TRPs the pathloss reference update refers to.

In some embodiments, the indication of which TRP the pathloss reference update refers to comprises: a new field to indicate one of two SRS resource sets, one of two sri-PUSCH-MappingToAddModLists, or one of two sri-PUSCH-PathlossReferenceRS-Ids the SRI ID fields or the PUSCH Pathloss Reference RS ID field in the control message are associated with.

In some embodiments, the indication of which TRP the pathloss reference update refers to comprises: an existing control message with a new field to indicate one of two SRS resource sets, one of two sri-PUSCH-MappingToAddModLists, or one of two sri-PUSCH-PathlossReferenceRS-Ids the SRI ID fields or the PUSCH Pathloss Reference RS ID field in the control message are associated with.

In some embodiments, the indication of which TRP the pathloss reference update refers to comprises: a new control message option where one control message updates both SRI ID to pathloss reference RS mappings associated to both SRS resource sets.

In some embodiments, a new field in the control message indicates a SRS resource set is introduced in MAC CE for PUSCH pathloss RS update when two SRS resource sets are configured for PUSCH transmissions to multiple TRPs.

In some embodiments, the control message comprises a new MAC CE allowing PUSCH pathloss update for SRIs associated with different SRS resource sets for per TRP power control in PUSCH repetition to multiple TRPs.

Certain embodiments may provide one or more of the following technical advantage(s). The new MAC CE allows PUSCH pathloss update for SRIs associated with different SRS resource sets for per TRP power control in PUSCH repetition to multiple TRPs.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
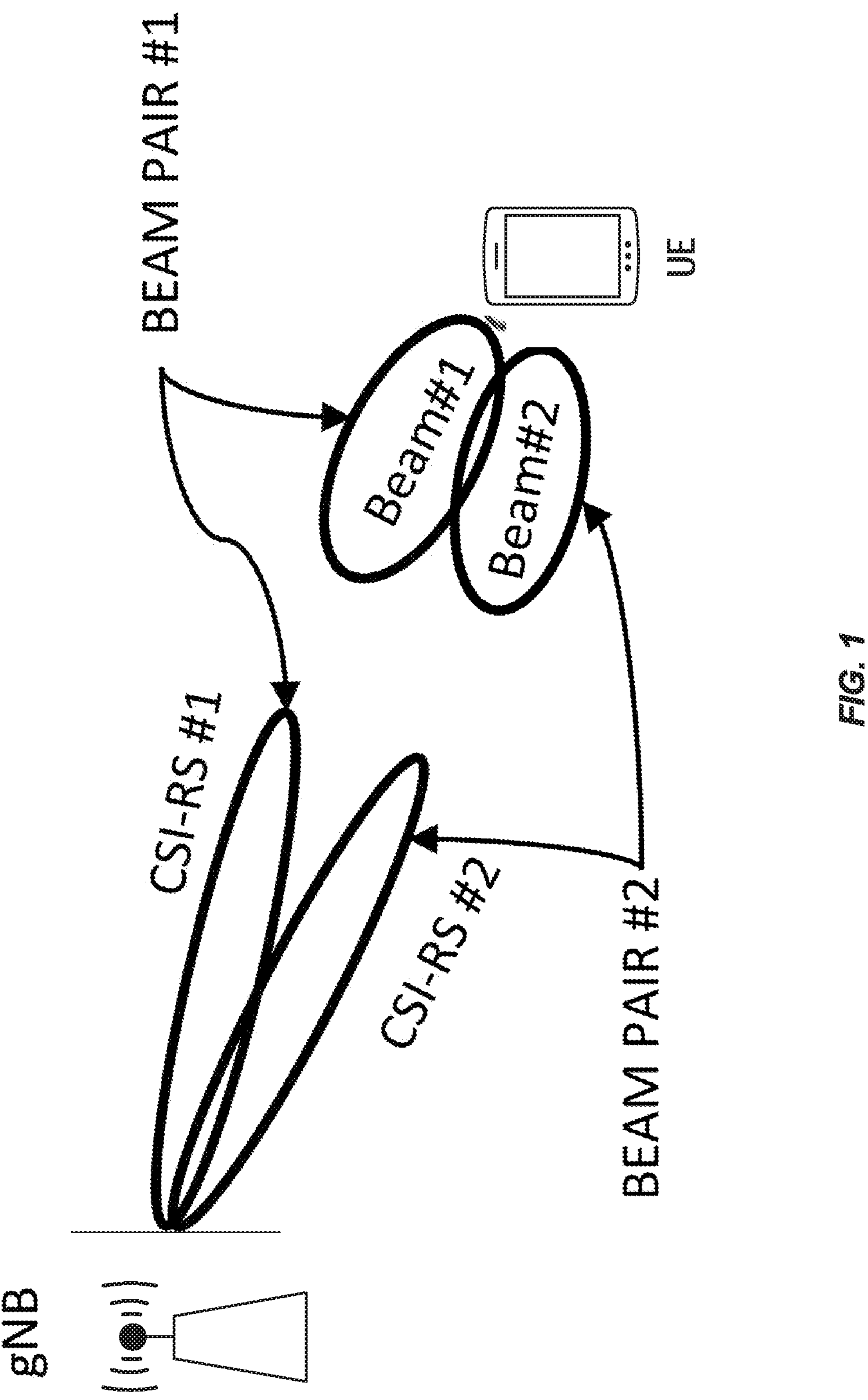
FIG. 1 shows an example, in which for PUSCH transmitted in beam #1 from a transmission/Reception Point (TRP), Channel State Information Reference Signal (CSI-RS) #1 may be configured as the pathloss reference RS.
Figure 2:
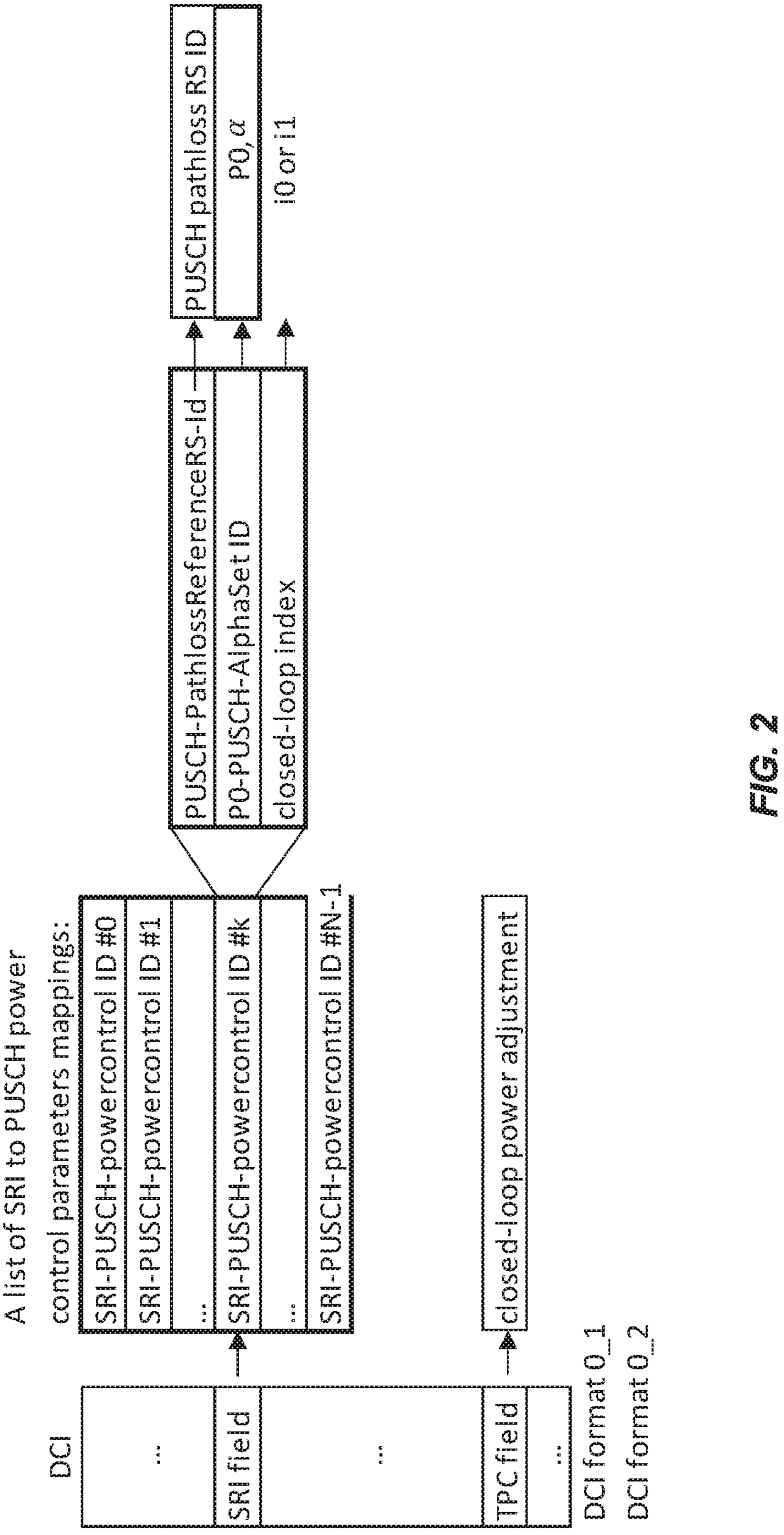
FIG. 2 illustrates that, for dynamically scheduled Physical Uplink Shared Channel (PUSCH), $P_{O,UE\_PUSCH}$, $\alpha$ and PL(k) are dependent on the associated Sounding Reference Signal (SRS) resource indicated in a Downlink Control Information (DCI) scheduling the PUSCH.
Figure 3:
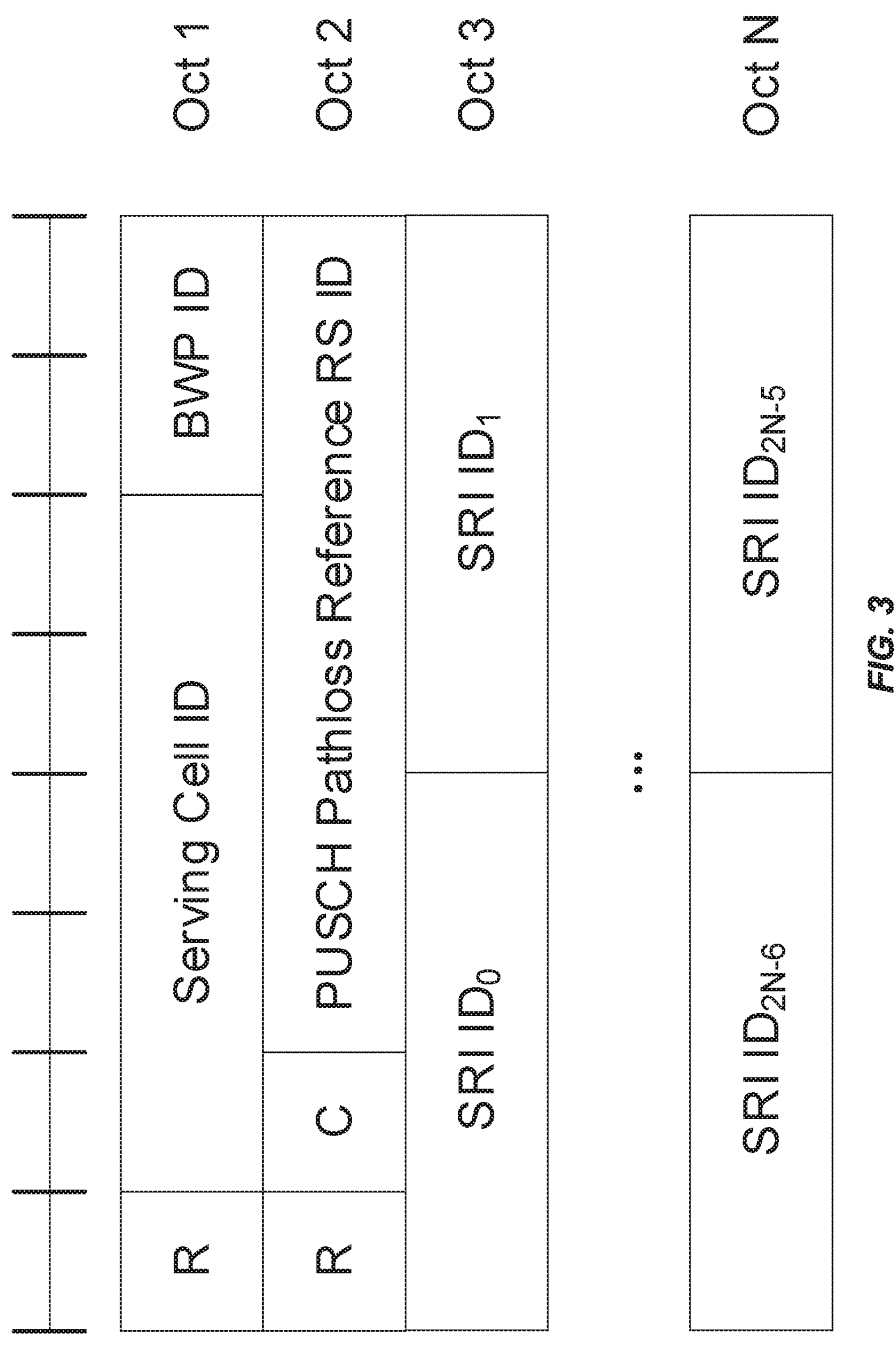
FIG. 3 illustrates a PUSCH pathloss reference RS ID associated with one or more SRS Resource Indicators (SRIs) can be updated by Medium Access Control (MAC) Control Element (CE)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IOT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation, a SRS resource set, a SRI or TPMI field, or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. In some embodiments, a serving cell can schedule UE to transmit to two TRPs, providing better PUSCH or PUCCH (Physical Uplink Control Channel) coverage, reliability and/or data rates. There are two different operation modes for multi-TRP: single DCI and multi-DCI based. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In the following embodiments, the term TRP is used. Note however that in 3GPP specifications, the term TRP may not be captured. Instead, each TRP is represented by one SRI (SRS resource indicator) or one UL TCI state. The SRI or UL TCI state essentially provides an indicator of a spatial beam that the UE should use to target an uplink transmission towards a given TRP. Furthermore, although the below embodiments are discussed using SRIs, the embodiments are non-limiting and can be equally applicable to cases where SRIs are replaced by UL TCI states.

Figure 4:
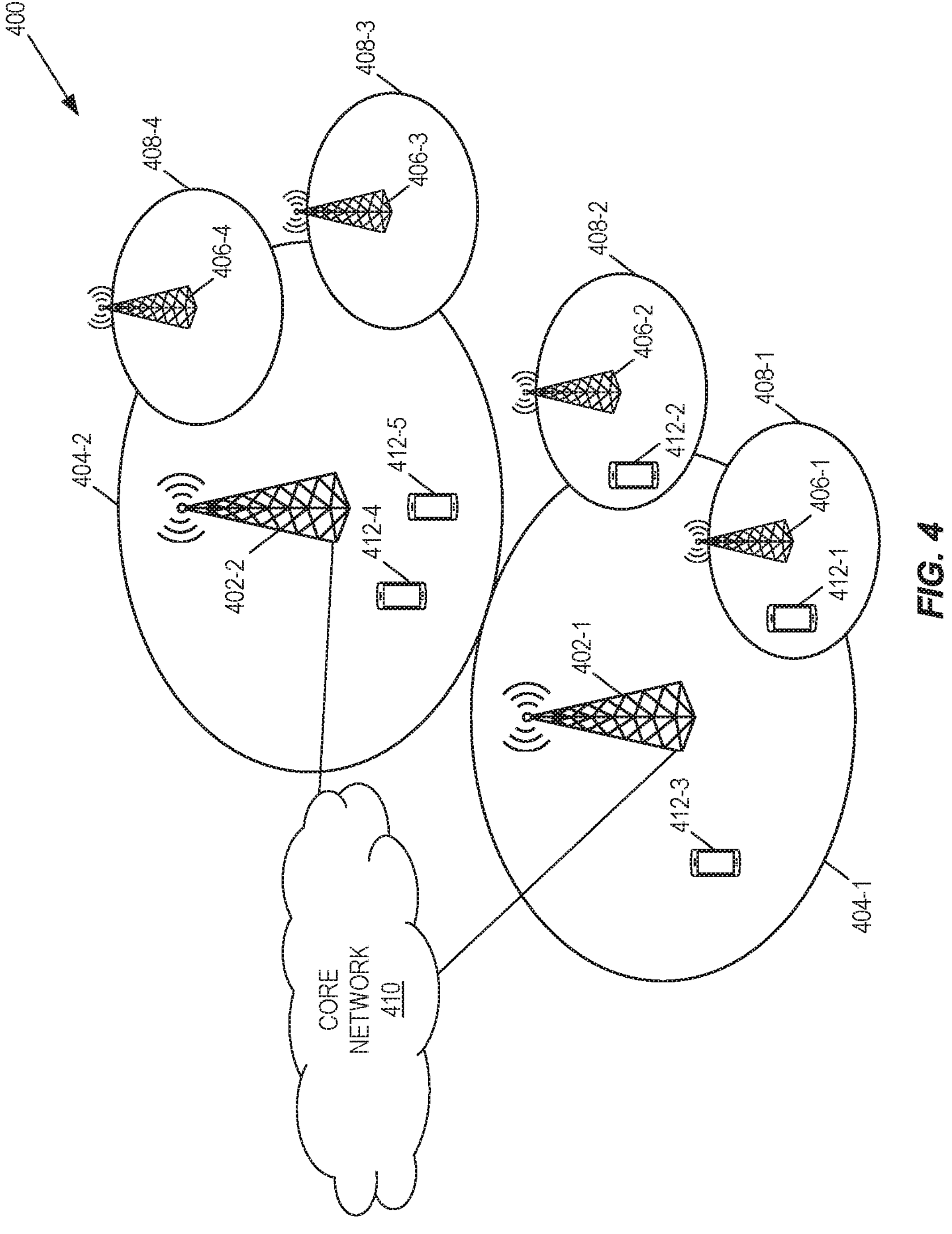
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC). In this example, the RAN includes base stations 402-1 and 402-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro)

cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or RRHs, or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
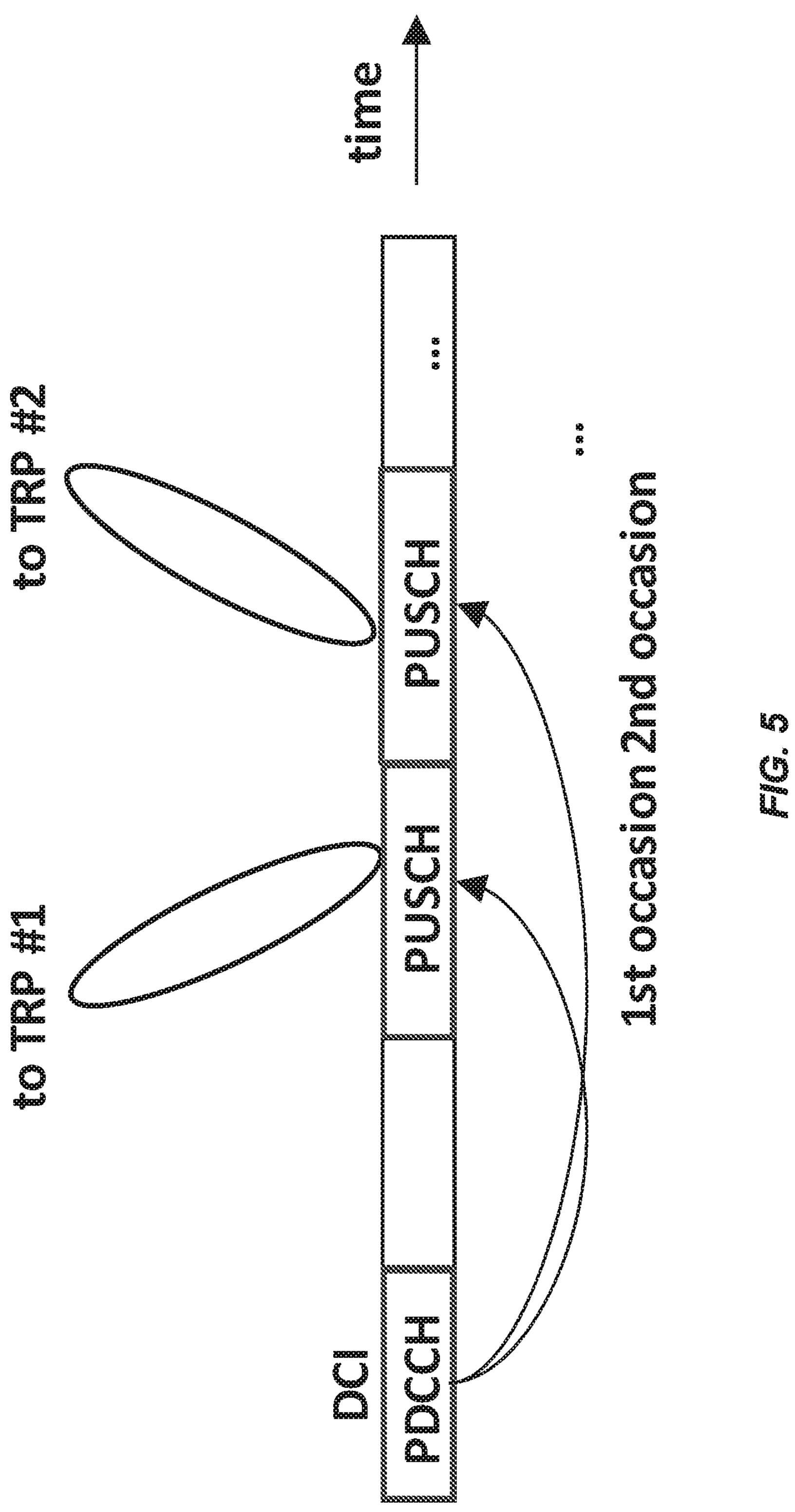
FIG. 5 illustrates an example of PUSCH repetitions to two TRPs, according to some embodiments of the present disclosure.
Figure 6:
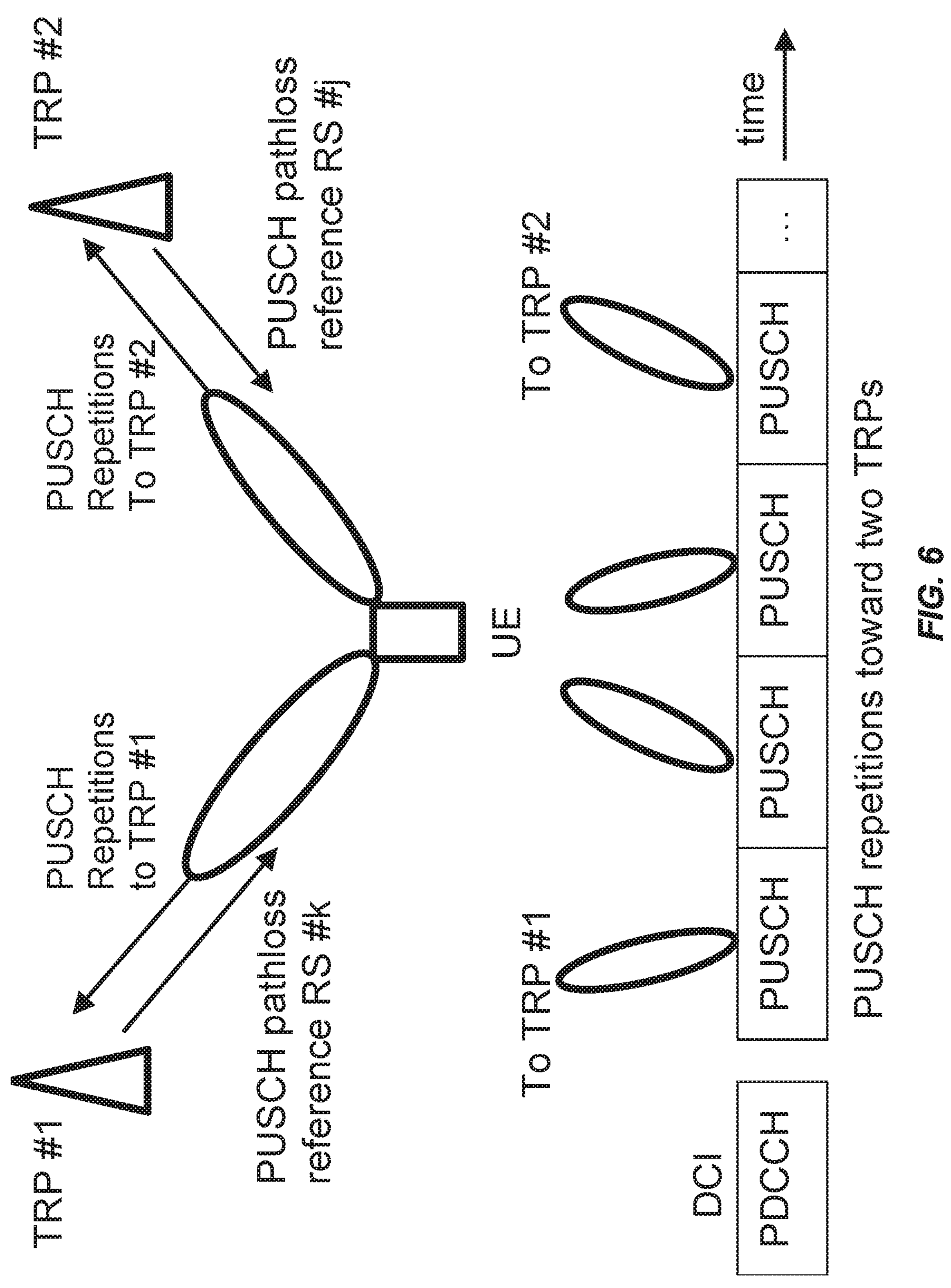
FIG. 6 illustrates an example of PUSCH repetitions towards two TRPs where different pathloss reference RS are configured for the two TRPs, according to some embodiments of the present disclosure.

FIG. 5 illustrates an example of PUSCH repetitions to two TRPs. FIG. 6 illustrates an example of PUSCH repetitions towards two TRPs where different pathloss reference RS are configured for the two TRPs.

Configuring Two Sets of PUSCH Power Control Parameters

To support PUSCH repetitions to multiple TRPs, two sets of PUSCH Power control parameters may be configured by RRC, each set is associated with one of two SRI fields in a DCI format scheduling a PUSCH.

In a first option, a second sri-PUSCH-MappingToAddModList is added to the PUSCH-PowerControl IE as shown below, where a first SRI field in a DCI format is associated with SRI-PUSCH-PowerControl in sri-PUSCH-MappingToAddModList and a second SRI field in the DCI format is associated with SRI-PUSCH-PowerControl in sri-PUSCH-MappingToAddModList-2-r17. The changes are highlighted in bold text.

Modified PUSCH-PowerControl information element

```
--  ASN1START
--  TAG-PUSCH-POWERCONTROL-START
PUSCH-PowerControl :: =                 SEQUENCE {
        tpc-Accumulation                    ENUMERATED { disabled }       OPTIONAL, -
- Need S
        msg3-Alpha                          Alpha                         OPTIONAL,
--  Need S
        p0-NominalWithoutGrant              INTEGER (−202..24)            OPTIONAL,
--  Need M
        p0-AlphaSets                        SEQUENCE (SIZE (1..maxNrofP0-PUSCH-
AlphaSets)) OF P0-PUSCH-AlphaSet
    OPTIONAL, -- Need M
        pathlossReferenceRSToAddModList     SEQUENCE (SIZE (1..maxNrofPUSCH-
PathlossReferenceRSs)) OF PUSCH-PathlossReferenceRS
    OPTIONAL, -- Need N
        pathlossReferenceRSToReleaseList    SEQUENCE (SIZE (1..maxNrofPUSCH-
PathlossReferenceRSs)) OF PUSCH-PathlossReferenceRS-Id
    OPTIONAL, -- Need N
        twoPUSCH-PC-AdjustmentStates        ENUMERATED {twoStates}        OPTIONAL,
--  Need S
        deltaMCS                            ENUMERATED {enabled}          OPTIONAL,
--  Need S
        sri-PUSCH-MappingToAddModList       SEQUENCE (SIZE (1..maxNrofSRI-PUSCH-
Mappings)) OF SRI-PUSCH-PowerControl
    OPTIONAL, -- Need N
        sri-PUSCH-MappingToReleaseList      SEQUENCE (SIZE (1..maxNrofSRI-PUSCH-
Mappings)) OF SRI-PUSCH-PowerControlId
    OPTIONAL -- Need N
}
P0-PUSCH-AlphaSet ::=                   SEQUENCE {
        p0-PUSCH-AlphaSetId                 P0-PUSCH-AlphaSetId,
        p0                                  INTEGER (−16..15)             OPTIONAL,
--  Need S
        alpha                               Alpha                         OPTIONAL
--  Need S
}
P0-PUSCH-AlphaSetId ::=                 INTEGER (0..maxNrofP0-PUSCH-AlphaSets-1)
PUSCH-PathlossReferenceRS ::=           SEQUENCE {
        pusch-PathlossReferenceRS-Id        PUSCH-PathlossReferenceRS-Id,
        referenceSignal                     CHOICE {
          ssb-Index                             SSB-Index,
          csi-RS-Index                          NZP-CSI-RS-ResourceId
        }
}
PUSCH-PathlossReferenceRS-r16 ::=       SEQUENCE {
        pusch-PathlossReferenceRS-Id-r16    PUSCH-PathlossReferenceRS-Id-v1610,
        referenceSignal-r16                 CHOICE {
          ssb-Index-r16                         SSB-Index,
          csi-RS-Index-r16                      NZP-CSI-RS-ResourceId
```

-continued

Modified PUSCH-PowerControl information element

```
        }
}
PUSCH-PathlossReferenceRS-Id ::=             INTEGER (0..maxNrofPUSCH-
PathlossReferenceRSs-1)
PUSCH-PathlossReferenceRS-Id-v1610 ::= INTEGER (maxNrofPUSCH-
PathlossReferenceRSs..maxNrofPUSCH-PathlossReferenceRSs-1-r16)
SRI-PUSCH-PowerControl ::=                   SEQUENCE {
        sri-PUSCH-PowerControlId               SRI-PUSCH-PowerControlId,
        sri-PUSCH-PathlossReferenceRS-Id       PUSCH-PathlossReferenceRS-Id,
        sri-P0-PUSCH-AlphaSetId                P0-PUSCH-AlphaSetId,
        sri-PUSCH-ClosedLoopIndex              ENUMERATED { i0, i1 }
}
SRI-PUSCH-PowerControlId ::=                 INTEGER (0..maxNrofSRI-PUSCH-Mappings-1)
PUSCH-PowerControl-v1610 ::=                 SEQUENCE {
        pathlossReferenceRSToAddModList2-r16     SEQUENCE (SIZE (1..maxNrofPUSCH-
PathlossReferenceRSsDiff-r16)) OF PUSCH-PathlossReferenceRS-r16            OPTIONAL, -
- Need N
        pathlossReferenceRSToReleaseList2-r16    SEQUENCE (SIZE (1..maxNrofPUSCH-
PathlossReferenceRSsDiff-r16)) OF PUSCH-PathlossReferenceRS-Id-v1610 OPTIONAL,
-- Need N
        p0-PUSCH-SetList-r16                   SEQUENCE (SIZE (1..maxNrofSRI-PUSCH-
Mappings)) of P0-PUSCH-Set-r16
     OPTIONAL, -- Need R
        olpc-ParameterSet                      SEQUENCE {
          olpc-ParameterSetDCI-0-1-r16             INTEGER (1..2)              OPTIONAL,
-- Need R
          olpc-ParameterSetDCI-0-2-r16             INTEGER (1..2)              OPTIONAL
-- Need R
        }                                                                      OPTIONAL,
-- Need M
        ...,
[[
     sri-PUSCH-MappingToAddModList-2-r17         SEQUENCE (SIZE (1..maxNrofSRI-
PUSCH-Mappings)) OF SRI-PUSCH-PowerControl
OPTIONAL, -- Need N
     sri-PUSCH-MappingToReleaseList-2-r17          SEQUENCE (SIZE (1..maxNrofSRI-
PUSCH-Mappings)) OF SRI-PUSCH-PowerControlId
]]
}
P0-PUSCH-Set-r16 ::=                         SEQUENCE {
        p0-PUSCH-SetId-r16                     P0-PUSCH-SetId-r16,
        p0-List-r16                            SEQUENCE (SIZE (1..maxNrofP0-PUSCH-
Set-r16)) OF P0-PUSCH-r16
     OPTIONAL, -- Need R
        ...
}
P0-PUSCH-SetId-r16 ::=                       INTEGER (0..maxNrofSRI-PUSCH-Mappings-1)
P0-PUSCH-r16 ::=                             INTEGER (−16..15)
--   TAG-PUSCH-POWERCONTROL-STOP
--   ASN1STOP
```

In a second option, a second set of parameters are added to SRI-PUSCH-PowerControl as shown below, where a first SRI field in a DCI format is associated with a first set of power control parameters SRI-PUSCH-PowerControl and a second SRI field in the DCI format is associated with a second set of parameters in SRI-PUSCH-PowerControl.

```
SRI-PUSCH-PowerControl-r17 ::=              SEQUENCE {
   sri-PUSCH-PowerControlId-r17                SRI-PUSCH-PowerControlId,
   sri-PUSCH-PathlossReferenceRS-Id-r17        PUSCH-PathlossReferenceRS-Id,
   sri-P0-PUSCH-AlphaSetId-r17                 P0-PUSCH-AlphaSetId,
  sri-PUSCH-ClosedLoopIndex-r17               ENUMERATED { i0, i1 }
   sri-PUSCH-PathlossReferenceRS-Id-2-r17        PUSCH-PathlossReferenceRS-Id,
   sri-P0-PUSCH-AlphaSetId-2-r17                 P0-PUSCH-AlphaSetId,
  sri-PUSCH-ClosedLoopIndex-2-r17               ENUMERATED { i0, i1 }
}
```

In a third option, a SRS resource set ID is added to each SRI-PUSCH-PowerControl mapping as shown below.

```
SRI-PUSCH-PowerControl-r17 ::=          SEQUENCE {
    sri-PUSCH-PowerControlId            SRI-PUSCH-PowerControlId,
    sri-PUSCH-PathlossReferenceRS-Id    PUSCH-PathlossReferenceRS-Id,
    sri-P0-PUSCH-AlphaSetId             P0-PUSCH-AlphaSetId,
  sri-PUSCH-ClosedLoopIndex           ENUMERATED { i0, i1 }
  srs-ResourceSetId                   SRS-ResourceSetId
}
```

MAC CE for Updating of PUSCH Pathloss Reference Signals

In the following embodiments, a MAC CE is used to update PUSCH pathloss reference RS for a set of SRI IDs when two SRS resource sets with usage set to either "codebook" or "nonCodebook" are configured in a bandwidth part (BWP) of a carrier of a serving cell.

Figure 7:
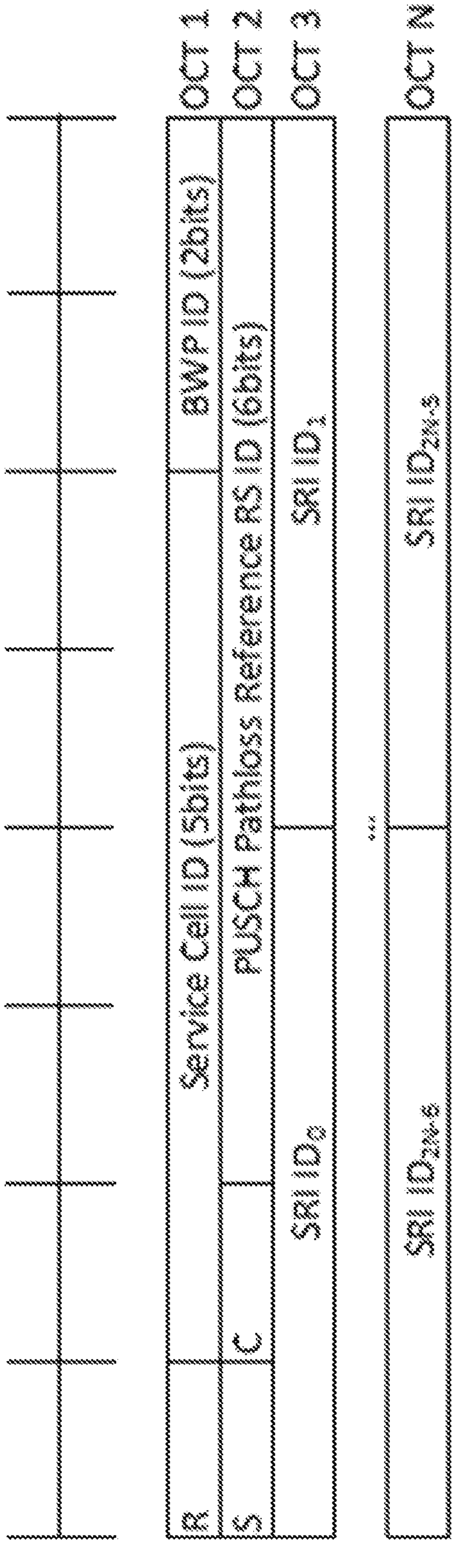
FIG. 7 illustrates an example where one of the reserved "R" fields in the existing MAC CE for PUSCH pathloss reference RS update is replaced with a new bit field "S", according to some embodiments of the present disclosure.

An example is shown in FIG. 7, where one of the reserved "R" fields in the existing MAC CE for PUSCH pathloss reference RS update is replaced with a new bit field "S". The "S" field indicates one of the two sets of PUSCH power control parameters that the SRI IDs in the same MAC CE is associated with. The same SRI ID space is used for both SRI fields in a DCI format and a UE maintains for each SRI ID up to two sets of mappings from SRI to PUSCH power control parameters, one for each of the two SRI fields. The field "S" tells the UE which one of the two sets of SRI ID(s) to a pathloss reference RS mappings is updated.

Figure 8:
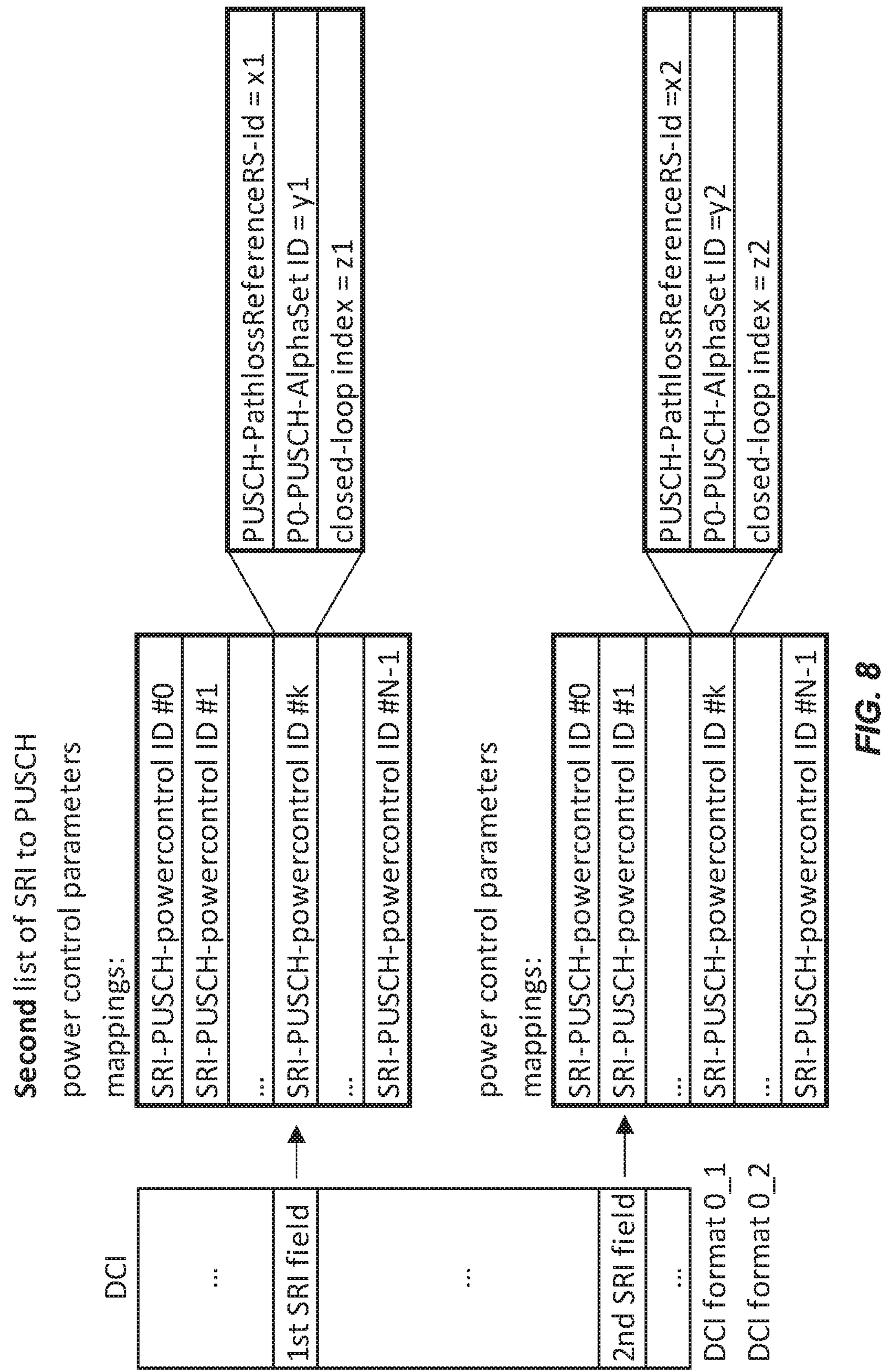
FIG. 8 illustrates an example where the DCI has two SRI fields, according to some embodiments of the present disclosure.

Then, when a SRI ID is signalled to a UE in a SRI field (i.e., a first or second SRI field) in a DCI format, the UE determine which set of SRI to PUSCH power control parameters mappings is to be interpreted for a PUSCH transmission associated with the SRI field. An example is shown in FIG. 8, where the DCI has two SRI fields. The first and second SRI fields are associated with a first and second sets of SRI to PUSCH power control parameter mappings, respectively. For each SRI ID indicated in each SRI field, it is used by the UE to look up a set of power control parameters (i.e., pathloss reference RS ID, Po-PUSCH-AlphaSetID, and closed-loop index) in the associated set of SRI to PUSCH power control parameter mappings. For a same SRI ID, different sets of PUSCH power control parameters may be mapped to in the two sets of SRI to PUSCH power control parameter mappings.

For the three different RRC configuration options discussed in the previous section, the "S" field may be interpreted differently for the different options.

EXAMPLE 1

In this example, it is assumed that a second sri-PUSCH-MappingToAddModList is added to PUSCH-PowerControl IE as shown in option 1 above in regard to PUSCH-PowerControl information element, where a first SRI field in a DCI format is associated with SRI-PUSCH-PowerControl in sri-PUSCH-MappingToAddModList and a second SRI field in the DCI format is associated with SRI-PUSCH-PowerControl in sri-PUSCH-MappingToAddModList-2-r17.

Note that depending on how the above is exactly implemented in RRC, the wording in the MAC CE may need to be adapted. The main principle is, however, that RRC stores two sets of SRI to PUSCH Power Control parameter mappings (e.g., SRI-PUSCH-MappingToAddModList and SRI-PUSCH-MappingToAddModList2) and each set is associated with an identifier (ID). The same SRI ID space is used in each set. Then, MAC CE updates the pathloss reference RS ID for either a firstset, e.g., SRI-PUSCH-MappingToAddModList, or a second set, e.g., SRI-PUSCH-MappingToAddModList2, depending on how the "S" field is set. If "S" is set to 0, the update is for the first set, i.e., SRI-PUSCH-MappingToAddModList, and if S is set to 1, the update is for the second set, i.e., SRI-PUSCH-MappingToAddModList2. Then, when UE receives a DCI format with two SRI fields, UE has the up to date pathloss reference RS to SRI mapping.

The wording in section 6.1.3.28 of 3GPP TS 38.321 v16.3.0 may be updated as follows, changes are highlighted with bold text:

----Start of text----

6.1.3.28 PUSCH Pathloss Reference RS Update MAC CE

The PUSCH Pathloss Reference RS Update MAC CE is identified by a MAC subheader with eLCID as specified in Table 6.2.1-1b. It has a variable size and consists of the following fields:

- Serving Cell ID: This field indicates the identity of the Serving Cell, which contains activated PUSCH Pathloss Reference RS. The length of the field is 5 bits;
- BWP ID: This field indicates a UL BWP as the codepoint of the DCI bandwidth part indicator field as specified in TS 38.212 [9], which contains activated PUSCH Pathloss Reference RS. The length of the field is 2 bits;
- PUSCH Pathloss Reference RS ID: This field indicates the PUSCH Pathloss Reference RS ID identified by PUSCH-PathlossReferenceRS-Id as specified in TS 38.331 [5], which is to be updated in the SRI PUSCH power control mappings indicated by SRI ID fields indicated in the same MAC CE. The length of the field is 6 bits;
- C: This field indicates the presence of the additional SRI ID in the last octet of this MAC CE. If this field is set to 1, two SRI ID(s) are present in the last octet. Otherwise only one SRI ID (i.e., the first SRI ID) is present in the last octet;
- S: This field indicates whether the MAC CE updates the SRI PUSCH power control mapping between SRI ID and pathloss reference RS ID in first list SRI-PUSCH-MappingToAddModList or in second list SRI-PUSCH-MappingToAddModList 2. If "S" is set to 0, update first list and if S is set to 1 update second list. The length of the field is 1 bit;
- SRI ID: This field indicates the SRI PUSCH power control ID identified by sri-PUSCH-PowerControlId as specified in TS 38.331 [5]. The length of the field is 4 bits;
- R: Reserved bit, set to 0.

----end of text----

EXAMPLE 2

In this example, it is assumed that the second option is used in RRC, i.e., a second set of parameters are added to SRI-PUSCH-PowerControl as shown above in relation to the second option by adding a second set of parameters to SRI-PUSCH-PowerControl, where a first SRI field in a DCI format is associated with a first set of power control parameters in a SRI-PUSCH-PowerControl IE and a second SRI field in the DCI is associated with a second set of parameters in the same SRI-PUSCH-PowerControl IE.

The main principle in this option is that RRC stores only one list of SRI to PUSCH power control parameter mappings (e.g., sri-PUSCH-MappingToAddModList) and there is one set of SRI IDs but each SRI ID is linked to two sets of power control parameters, a first and a second sets. The first and second sets are associated with a first and second SRI fields in a DCI format, respectively. The MAC CE updates either the first pathloss reference RS indicated by sri-PUSCH-PathlossReferenceRS-Id-r17 in SRI-PUSCH-PowerControl-r17 associated with one or more SRI IDs, or the second pathloss reference RS ID indicated by sri-PUSCH-PathlossReferenceRS-Id-2-r17 in SRI-PUSCH-PowerControl-r17 associated with the one or more SRI IDs, depending on how the "S" field is set. If "S" is set to 0, update the first pathloss reference RS and if S is set to 1, update the second pathloss reference RS. Then, when UE receives the DCI format with two SRI fields, UE has the up to date pathloss reference RS to SRI mapping.

Section 6.1.3.28 of 3GPP TS 38.321 may be updated as follows:

----Start text----

6.1.3.28 PUSCH Pathloss Reference RS Update MAC CE 6.1.3.28

The PUSCH Pathloss Reference RS Update MAC CE is identified by a MAC subheader with eLCID as specified in Table 6.2.1-1b. It has a variable size and consists of the following fields:

Serving Cell ID: This field indicates the identity of the Serving Cell, which contains activated PUSCH Pathloss Reference RS. The length of the field is 5 bits;

BWP ID: This field indicates a UL BWP as the codepoint of the DCI bandwidth part indicator field as specified in TS 38.212 [9], which contains activated PUSCH Pathloss Reference RS. The length of the field is 2 bits;

PUSCH Pathloss Reference RS ID: This field indicates the PUSCH Pathloss Reference RS ID identified by PUSCH-PathlossReferenceRS-Id as specified in TS 38.331 [5], which is to be updated in the SRI PUSCH power control mappings indicated by SRI ID fields indicated in the same MAC CE. The length of the field is 6 bits;

C: This field indicates the presence of the additional SRI ID in the last octet of this MAC CE. If this field is set to 1, two SRI ID(s) are present in the last octet. Otherwise only one SRI ID (i.e., the first SRI ID) is present in the last octet;

S: This field indicates whether the MAC CE updates the SRI to PUSCH power control mapping between SRI ID and sri-PUSCH-PathlossReferenceRS-Id-r17 or sri-PUSCH-PathlossReferenceRS-Id-2-r17. If "S" is set to 0, update sri-PUSCH-PathlossReferenceRS-Id-r17 and if S is set to 1 update sri-PUSCH-PathlossReferenceRS-Id-2-r17. The length of the field is 1 bit.

SRI ID: This field indicates the SRI PUSCH power control ID identified by sri-PUSCH-PowerControlId as specified in TS 38.331 [5]. The length of the field is 4 bits.

R: Reserved bit, set to 0.

----End of text----

EXAMPLE 3

In this example, it is assumed that the third option is used in RRC, i.e., a SRS resource set ID is added to each SRI-PUSCH-PowerControl mapping as shown above. Section 6.1.3.28 of 3GPP TS 38.321 may be updated as follows:

----Start text----

6.1.3.28 PUSCH Pathloss Reference RS Update MAC CE

The PUSCH Pathloss Reference RS Update MAC CE is identified by a MAC subheader with eLCID as specified in Table 6.2.1-1b. It has a variable size and consists of the following fields:

Serving Cell ID: This field indicates the identity of the Serving Cell, which contains activated PUSCH Pathloss Reference RS. The length of the field is 5 bits;

BWP ID: This field indicates a UL BWP as the codepoint of the DCI bandwidth part indicator field as specified in TS 38.212 [9], which contains activated PUSCH Pathloss Reference RS. The length of the field is 2 bits;

PUSCH Pathloss Reference RS ID: This field indicates the PUSCH Pathloss Reference RS ID identified by PUSCH-PathlossReferenceRS-Id as specified in TS 38.331 [5], which is to be updated in the SRI PUSCH power control mappings indicated by SRI ID fields indicated in the same MAC CE. The length of the field is 6 bits;

C: This field indicates the presence of the additional SRI ID in the last octet of this MAC CE. If this field is set to 1, two SRI ID(s) are present in the last octet. Otherwise only one SRI ID (i.e., the first SRI ID) is present in the last octet;

SRS Resource set ID: This field indicates the SRS Resource set ID identified by SRS-ResourceSetId as specified in TS 38.331 [5], which is to be updated in the SRI PUSCH power control mappings indicated by SRI ID fields indicated in the same MAC CE. The length of the field is 1 bit;

SRI ID: This field indicates the SRI PUSCH power control ID identified by sri-PUSCH-PowerControlId as specified in TS 38.331 [5]. The length of the field is 4 bits;

R: Reserved bit, set to 0.

----End of text----

Figure 10:
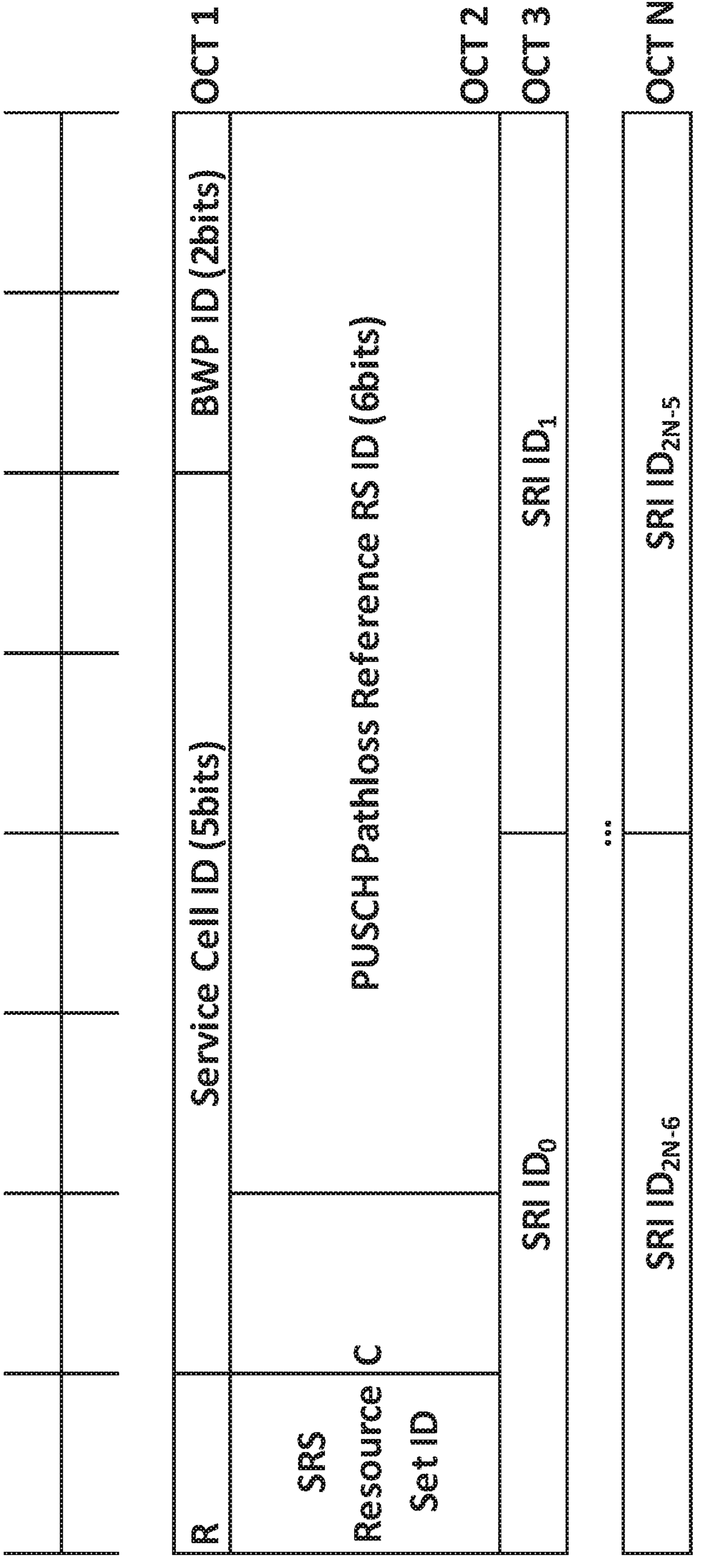
FIG. 10 illustrates some possible implementations of a MAC CE, according to some embodiments of the present disclosure.

Some possible implementations of this might be shown in FIG. 10.

MAC CEs for joint update of both pathloss reference RS IDs for SRI ID

In this embodiment, the main principle is to use one MAC CE to jointly update pathloss reference RS for SRI IDs associated with both SRS resource sets. Then, depending on how the RRC is implemented, there are different options for the MAC CE design. The advantage is that one MAC CE is enough to update both mappings.

For the first option of RRC configuration, the MAC CE would contain two PUSCH pathloss reference RS IDs and two sets of SRI IDs. A first set of SRI IDs are those stored in SRI-PUSCH-MappingToAddModList and a second set of SRI IDs are those stored in SRI-PUSCH-MappingToAddModList2. Since there are two sets of SRI fields in this alternative, the MAC CE needs two C fields to tell whether the last octet belongs to either SRI-PUSCH-MappingToAddModList or SRI-PUSCH-MappingToAddModList2 contains 1 or 2 SRI IDs. This MAC CE does not need the "S" field.

For the second option of RRC configuration, the MAC CE needs to contain two PUSCH pathloss reference RS IDs but only one set of SRI IDs. Accordingly, the MAC CE needs only one C field. The MAC CE does not need the S field. An example of the MAC CE design shown in FIG. 9, PUSCH pathloss reference RS IDs corresponding to both SRS Resource sets. In this example embodiment, two PUSCH pathloss reference RS IDs are provided in the MAC CE.

The 'PUSCH Pathloss Reference RS ID' provides the pathloss reference RS ID to be applied to sri-PUSCH-PowerControlId given by the SRI ID fields in the same MAC CE associated with a first SRS resource set or a first SRI field in a DCI format. The 'PUSCH Pathloss Reference RS ID 2' provides the pathloss reference RS ID to be applied to sri-PUSCH-PowerControlId given by the same SRI ID fields associated with a second SRS resource set or a second SRI field in the DCI format.

Figure 9:
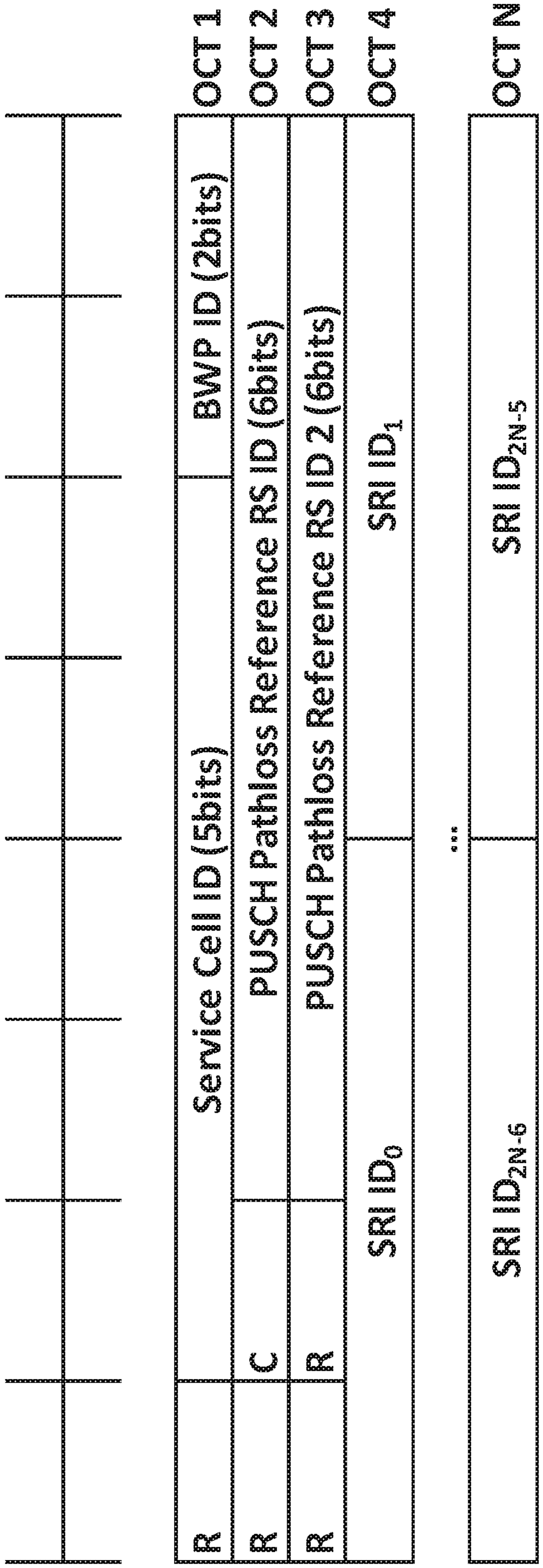
FIG. 9 illustrates an example of the MAC CE design, PUSCH pathloss reference RS IDs corresponding to both SRS Resource sets, according to some embodiments of the present disclosure.

Note that in the example of FIG. 9, pathloss reference RS IDs corresponding to the same SRI ID fields of both SRS resource sets are updated simultaneously. In an alternative embodiment, the MAC CE is designed such that a first pathloss reference RS ID is updated for a first set of SRI ID fields corresponding to the first SRS resource set, and the second pathloss reference RS ID is updated for a second set of SRI ID fields corresponding to the second SRS resource set. Note that the first set and the second set here are different sets. This alternative embodiment allows the pathloss reference RS IDs to be more flexibly updated.

Figure 11:
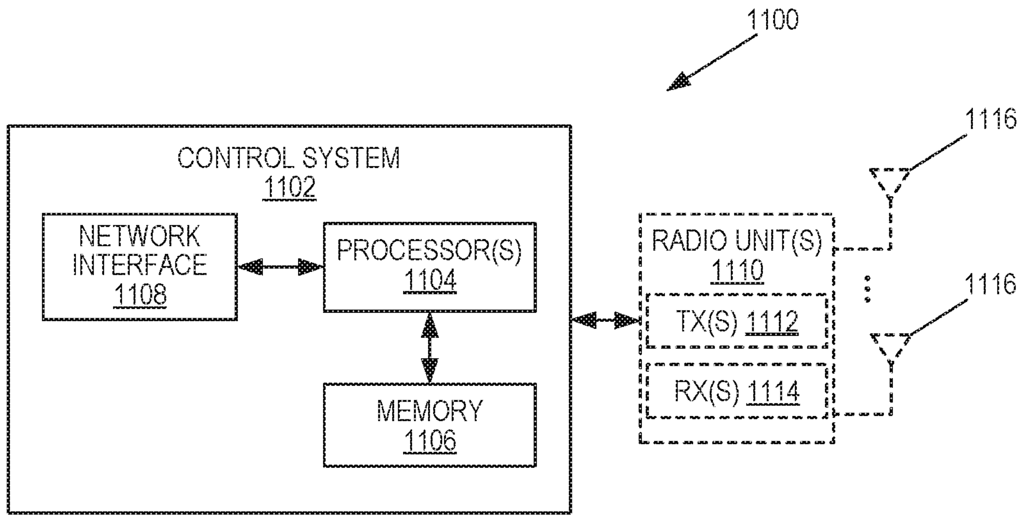
FIG. 11 is a schematic block diagram of a radio access node, according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 402 or 406 or a network node that implements all or part of the functionality of the base station 402 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
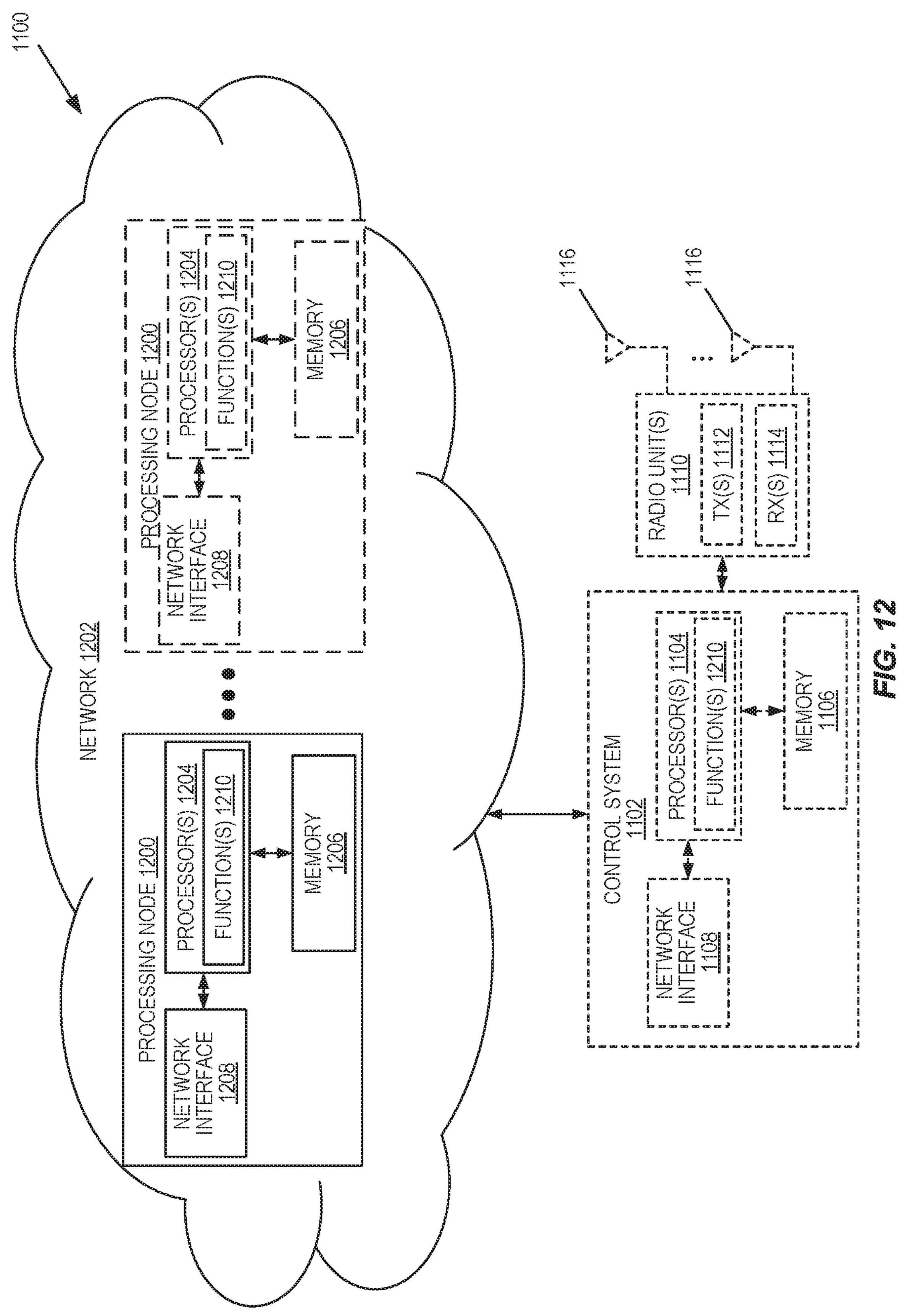
FIG. 12 is a schematic block diagram that illustrates a virtualized embodiment of the radio access node, according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAS, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
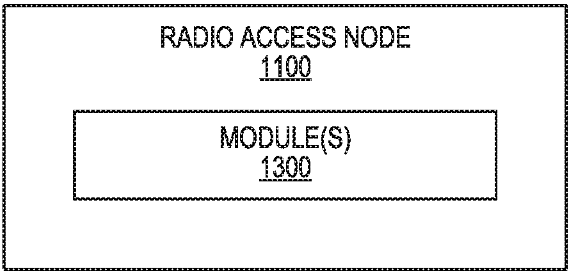
FIG. 13 is a schematic block diagram of the radio access node, according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
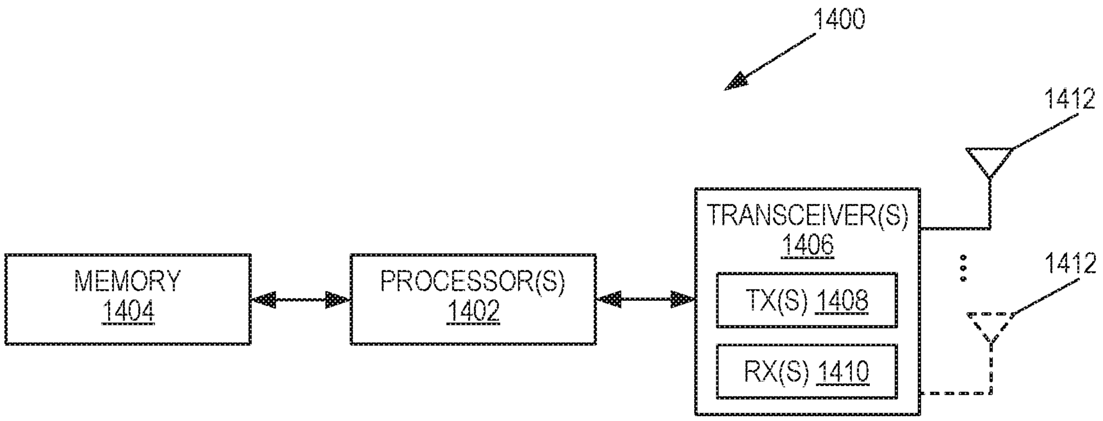
FIGS. 14 and 15 are schematic block diagrams of a wireless communication device, according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICS, FPGAS, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
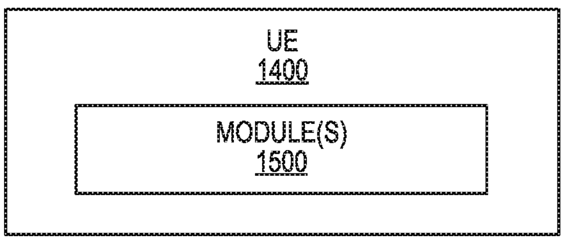

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Figure 16:
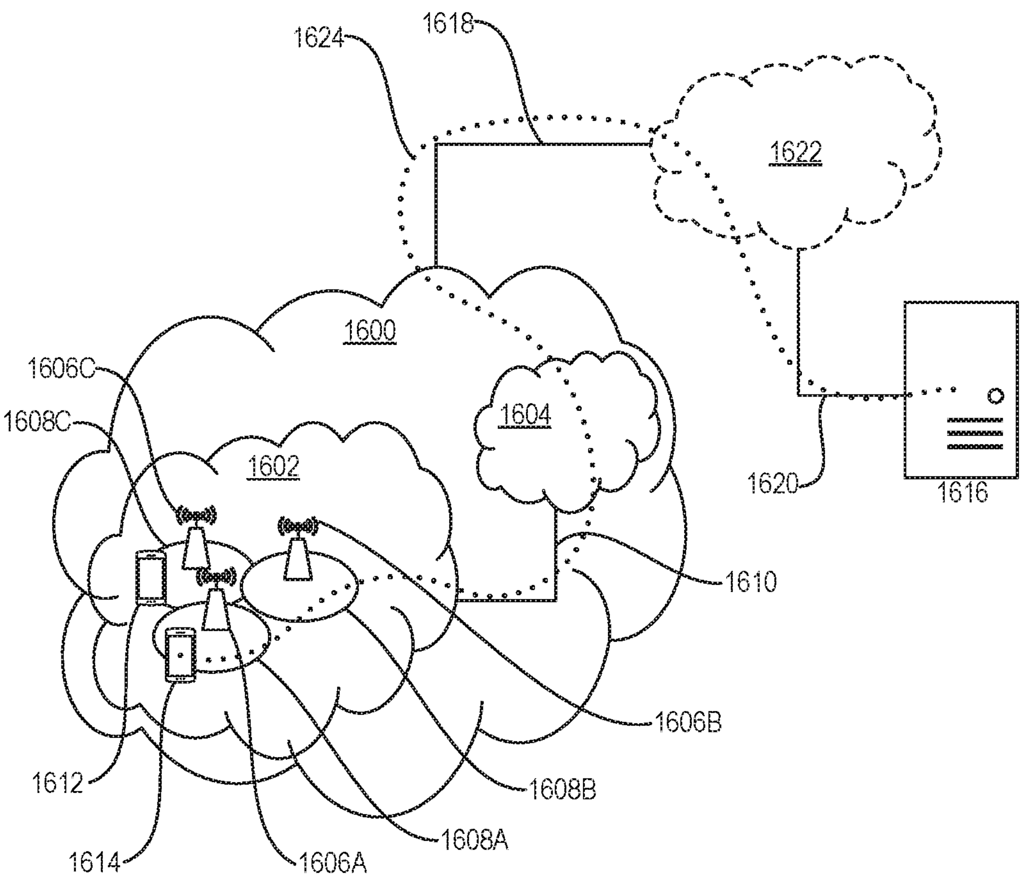
FIG. 16 illustrates a communication system including a telecommunication network, such as a Third Generation Partnership Project (3GPP)-type cellular network, which comprises an access network, such as a Radio Access Network (RAN), and a core network, according to some other embodiments of the present disclosure.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAS, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICS, FPGAS, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
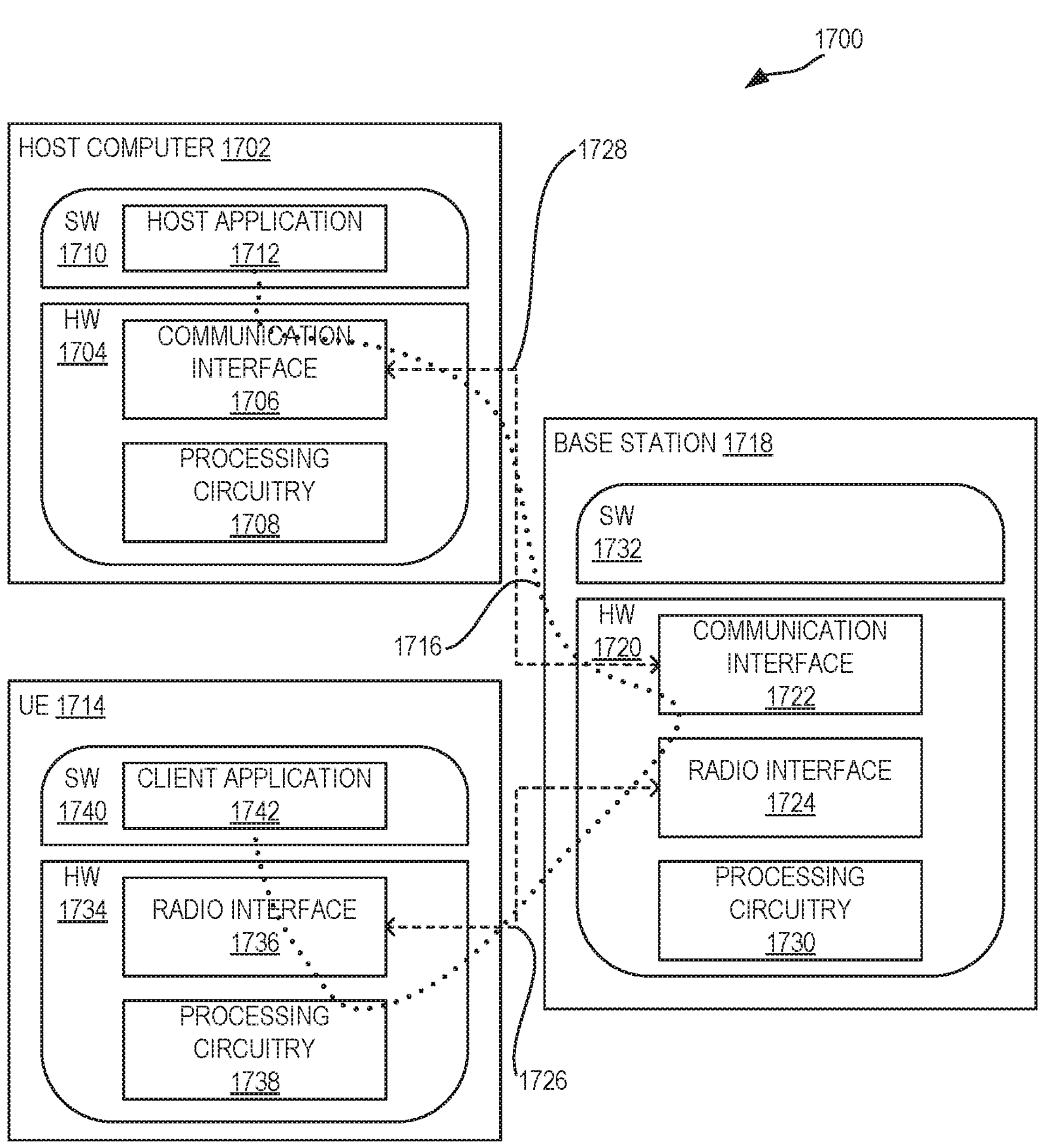
FIG. 17 illustrates a communication system, a host computer comprises hardware including a communication interface configured to set up and maintain a wired or wireless connection with an interface of a different communication device of the communication system, according to some other embodiments of the present disclosure.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

Figures 18, 19:
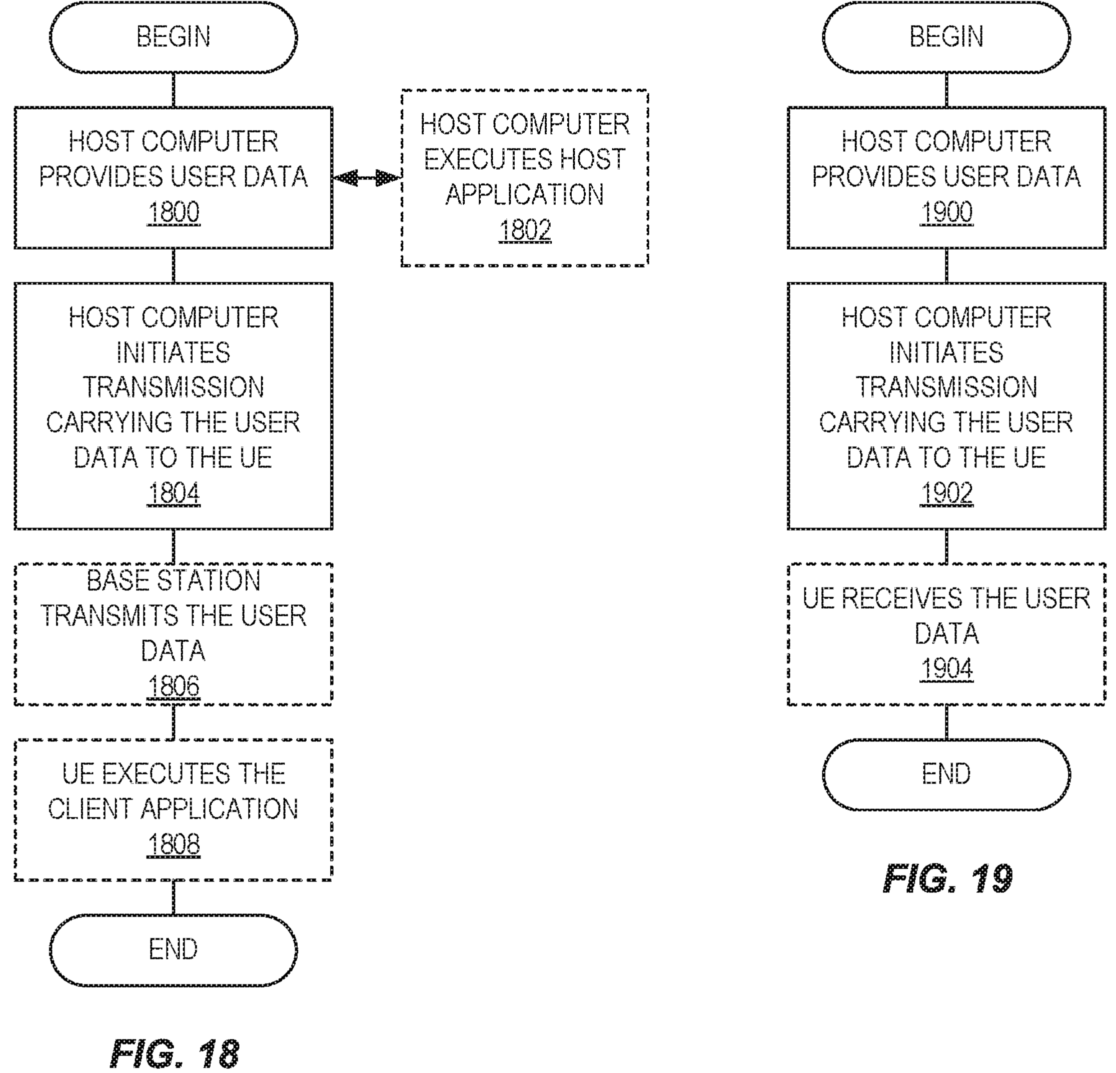
FIGS. 18-21 are flowcharts illustrating a method implemented in a communication system, according to some other embodiments of the present disclosure.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

Figures 20, 21:
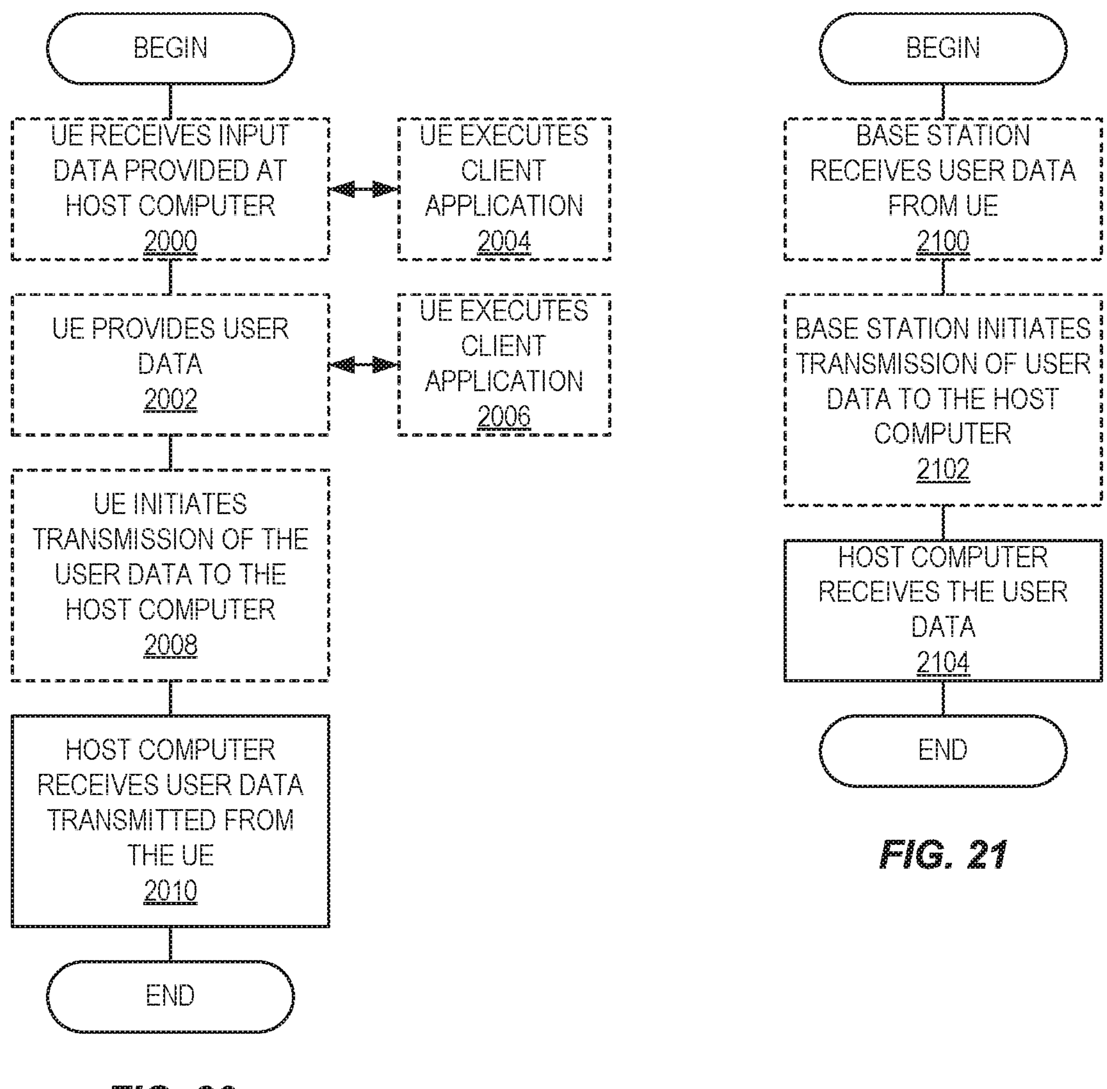

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for identifying which TRP of a plurality of TRPs an update refers to, the method comprising one or more of: receiving a control message indicating a pathloss reference update; where the control message comprises an indication of which TRP of the plurality of TRPs the pathloss reference update refers to.

Embodiment 2: The method of embodiment 1 wherein the control message comprises a MAC CE.

Embodiment 3: The method of any of embodiments 1 to 2 wherein the pathloss reference update comprises a PUSCH Pathloss Reference RS ID field.

Embodiment 4: The method of any of embodiments 1 to 2 wherein the pathloss reference update comprises one or more SRI ID fields.

Embodiment 5: The method of any of embodiments 1 to 4 wherein the indication of which TRP the pathloss reference update refers to comprises: a new field to indicate one of two SRS resource sets, one of two sri-PUSCH-MappingToAddModLists, or one of two sri-PUSCH-PathlossReferenceRS-Ids the one or more SRI ID fields and/or the PUSCH Pathloss Reference RS ID field in the control message are associated with.

Embodiment 6: The method of any of embodiments 1 to 4 wherein the indication of which TRP the pathloss reference update refers to comprises: an existing control message with a new field to indicate one of two SRS resource sets, one of two sri-PUSCH-MappingToAddModLists, or one of two sri-PUSCH-PathlossReferenceRS-Ids the one or more SRI ID fields and/or the PUSCH Pathloss Reference RS ID field in the control message are associated with.

Embodiment 7: The method of any of embodiments 1 to 4 wherein the indication of which TRP the pathloss reference update refers to comprises: a new control message option where one control message updates both SRI ID to pathloss reference RS mappings associated to both SRS resource sets.

Embodiment 8: The method of any of embodiments 1 to 7 wherein a new field in the control message indicates a SRS resource set is introduced in MAC CE for PUSCH pathloss RS update when two SRS resource sets are configured for PUSCH transmissions to multiple TRPs.

Embodiment 9: The method of any of embodiments 1 to 8 wherein the control message comprises a new MAC CE allowing PUSCH pathloss update for SRIs associated with different SRS resource sets for per TRP power control in PUSCH repetition to multiple TRPs.

Embodiment 10: The method of any of the previous embodiments, further comprising: providing user data; and forwarding the user data to a host computer via the transmission to the base station.

Group B Embodiments

Embodiment 11: A method performed by a base station for identifying which TRP of a plurality of TRPs an update refers to, the method comprising: transmitting a control message indicating a pathloss reference update; where the control message comprises an indication of which TRP of the plurality of TRPs the pathloss reference update refers to.

Embodiment 12: The method of embodiment 11 wherein the control message comprises a MAC CE.

Embodiment 13: The method of any of embodiments 11 to 12 wherein the pathloss reference update comprises a PUSCH Pathloss Reference RS ID field.

Embodiment 14: The method of any of embodiments 11 to 12 wherein the pathloss reference update comprises one or more SRI ID fields.

Embodiment 15: The method of any of embodiments 11 to 14 wherein the indication of which TRP the pathloss reference update refers to comprises: a new field to indicate one of two SRS resource sets, one of two sri-PUSCH-MappingToAddModLists, or one of two sri-PUSCH-PathlossReferenceRS-Ids the one or more SRI ID fields and/or the PUSCH Pathloss Reference RS ID field in the control message are associated with.

Embodiment 16: The method of any of embodiments 11 to 14 wherein the indication of which TRP the pathloss reference update refers to comprises: an existing control message with a new field to indicate one of two SRS resource sets, one of two sri-PUSCH-MappingToAddModLists, or one of two sri-PUSCH-PathlossReferenceRS-Ids the one or more SRI ID fields and/or the PUSCH Pathloss Reference RS ID field in the control message are associated with.

Embodiment 17: The method of any of embodiments 11 to 14 wherein the indication of which TRP the pathloss reference update refers to comprises: a new control message option where one control message updates both SRI ID to pathloss reference RS mappings associated to both SRS resource sets.

Embodiment 18: The method of any of embodiments 11 to 17 wherein a new field in the control message indicates a SRS resource set is introduced in MAC CE for PUSCH pathloss RS update when two SRS resource sets are configured for PUSCH transmissions to multiple TRPs.

Embodiment 19: The method of any of embodiments 11 to 18 wherein the control message comprises a new MAC CE allowing PUSCH pathloss update for SRIs associated with different SRS resource sets for per TRP power control in PUSCH repetition to multiple TRPs.

Embodiment 20: The method of any of the previous embodiments, further comprising: obtaining user data; and forwarding the user data to a host computer or a wireless device.

Group C Embodiments

Embodiment 21: A wireless device for identifying which TRP of a plurality of TRPs an update refers to, the wireless device comprising: processing circuitry configured to perform any of the steps of any of the Group A embodiments; and power supply circuitry configured to supply power to the wireless device.

Embodiment 22: A base station for identifying which TRP of a plurality of TRPs an update refers to, the base station comprising: processing circuitry configured to perform any of the steps of any of the Group B embodiments; and power supply circuitry configured to supply power to the base station.

Embodiment 23: A User Equipment, UE, for identifying which TRP of a plurality of TRPs an update refers to, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 24: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 25: The communication system of the previous embodiment further including the base station.

Embodiment 26: The communication system of the previous 2 embodiments, further including the UE, wherein the UE is configured to communicate with the base station.

Embodiment 27: The communication system of the previous 3 embodiments, wherein: the processing circuitry of the host computer is configured to execute a host application, thereby providing the user data; and the UE comprises processing circuitry configured to execute a client application associated with the host application.

Embodiment 28: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 29: The method of the previous embodiment, further comprising, at the base station, transmitting the user data.

Embodiment 30: The method of the previous 2 embodiments, wherein the user data is provided at the host computer by executing a host application, the method further comprising, at the UE, executing a client application associated with the host application.

Embodiment 31: A User Equipment, UE, configured to communicate with a base station, the UE comprising a radio interface and processing circuitry configured to perform the method of the previous 3 embodiments.

Embodiment 32: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 33: The communication system of the previous embodiment, wherein the cellular network further includes a base station configured to communicate with the UE.

Embodiment 34: The communication system of the previous 2 embodiments, wherein: the processing circuitry of the host computer is configured to execute a host application, thereby providing the user data; and the UE's processing circuitry is configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 36: The method of the previous embodiment, further comprising at the UE, receiving the user data from the base station.

Embodiment 37: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 38: The communication system of the previous embodiment, further including the UE.

Embodiment 39: The communication system of the previous 2 embodiments, further including the base station, wherein the base station comprises a radio interface configured to communicate with the UE and a communication interface configured to forward to the host computer the user data carried by a transmission from the UE to the base station.

Embodiment 40: The communication system of the previous 3 embodiments, wherein: the processing circuitry of the host computer is configured to execute a host application; and the UE's processing circuitry is configured to execute a client application associated with the host application, thereby providing the user data.

Embodiment 41: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 42: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 43: The method of the previous embodiment, further comprising, at the UE, providing the user data to the base station.

Embodiment 44: The method of the previous 2 embodiments, further comprising: at the UE, executing a client application, thereby providing the user data to be transmitted; and at the host computer, executing a host application associated with the client application.

Embodiment 45: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 46: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 47: The communication system of the previous embodiment further including the base station.

Embodiment 48: The communication system of the previous 2 embodiments, further including the UE, wherein the UE is configured to communicate with the base station.

Embodiment 49: The communication system of the previous 3 embodiments, wherein: the processing circuitry of the host computer is configured to execute a host application; and the UE is configured to execute a client application associated with the host application, thereby providing the user data to be received by the host computer.

Embodiment 50: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 51: The method of the previous embodiment, further comprising at the base station, receiving the user data from the UE.

Embodiment 52: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CE Control Element
CPU Central Processing Unit
DCI Downlink Control Information
DN Data Network
DSP Digital Signal Processor
eNB Enhanced or Evolved Node B
EPS Evolved Packet System
E-UTRA Evolved Universal Terrestrial Radio Access
FPGA
Field Programmable Gate Array
New Radio Base Station
gNB
gNB-DU New Radio Base Station Distributed Unit
HSS Home Subscriber Server
ID Identifier
IOT Internet of Things
IP Internet Protocol
LTE Long Term Evolution
MAC Medium Access Control
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway PUSCH Physical Uplink Shared Channel
QoS Quality of Service
RAM Random Access Memory
RAN Radio Access Network
ROM Read Only Memory
RRH Remote Radio Head
RS Reference Signal
RTT Round Trip Time
SCEF Service Capability Exposure Function
SMF Session Management Function
SRI Sounding Reference Signal Resource Indicator
SRS Sounding Reference Signal
TRP Transmission Reception Point
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for identifying which Transmission and Reception Point, TRP, of a first and a second TRP an update refers to, the method comprising:

receiving a configuration of a first and a second Sounding Reference Signal, SRS, resource set, associated to the first and the second TRPs, respectively;

receiving a control message indicating a Physical Uplink Shared Channel, PUSCH, pathloss reference update associated to one of the first and the second SRS resource sets;

where the control message comprises an indication of which one of the first and the second TRPs the PUSCH pathloss reference update refers to;

wherein the control message further comprises a bit field to indicate one of the first and the second SRS resource sets, wherein the one or more SRS Resource Indicator, SRI, identifier, ID, fields are associated with the one of the first and the second SRS resource sets;

wherein the method further comprises receiving a configuration of a first list of SRI to PUSCH power control mappings associated to the first SRS resource set and a second list of SRI to PUSCH power control mappings associated to the second SRS resource set, where each of the first and the second lists of SRI to PUSCH power control mappings comprises an SRI ID and the PUSCH pathloss RS ID;

wherein the indication of which TRP the pathloss reference update refers to comprises:

a control message option where one control message updates both a first pathloss RS for a first set of SRI IDs associated to the first SRS resource set and a second pathloss RS for a second set of SRI IDs associated to the second SRS resource set.

2. The method of claim 1 wherein the control message comprises a Medium Access Control, MAC, Control Element, CE.

3. The method of claim 1, wherein the control message comprises a PUSCH Pathloss Reference Signal, RS, identifier, ID, field indicating a PUSCH pathloss RS ID.

4. The method of claim 1, wherein the control message also comprises one or more SRS Resource Indicator, SRI, identifier, ID, fields, wherein each of the one or more SRI ID fields indicates an SRI PUSCH power control ID.

5. The method of claim 1, wherein the indication of which one of the first and the second TRPs the pathloss reference update refers to comprises the indication of one of the first and the second SRS resource sets.

6. The method of claim 1, wherein for each of the one or more SRI ID fields in the control message, the associated PUSCH pathloss RS ID is updated or replaced by the PUSCH pathloss RS ID contained in the control message.

7. The method of claim 1, wherein the method further comprises receiving a configuration of a list of PUSCH pathloss reference signals each associated with a PUSCH pathloss RS ID.

8. The method of claim 1, wherein the configuration of the first and the second SRS resource sets comprises a configuration of the first and the second SRS resource sets for a downlink control information, DCI, format, wherein the DCI format is used to schedule a PUSCH repetition to the first and the second TRPs.

9. The method of claim 1, wherein the DCI format comprises a first and a second SRI field associated with the first and the second SRS resource sets, respectively.

10. The method of claim 1, wherein the first and the second SRS resource sets are configured for either codebook based or non-codebook based PUSCH transmission.

11. The method of claim 1, wherein the wireless device operates in a Fifth Generation, 5G, New Radio, NR, network.

12. A method performed by a base station for indicating which one of a first and a second Transmission and Reception Point, TRP, an update refers to, the method comprising:

transmitting a configuration of a first and a second Sounding Reference Signal, SRS, resource set, associated to the first and second TRPs, respectively;

transmitting a control message indicating a pathloss reference update associated to one of the first and second SRS resource sets;

where the control message comprises an indication of which one of the first and second TRPs the pathloss reference update refers to;

wherein the control message further comprises a bit field to indicate one of the first and the second SRS resource sets, wherein the one or more SRS Resource Indicator, SRI, identifier, ID, fields are associated with the one of the first and the second SRS resource sets;

wherein the method further comprises transmitting a configuration of a first list of SRI to Physical Uplink shared Channel, PUSCH, power control mappings associated to the first SRS resource set and a second list of SRI to PUSCH power control mappings associated to the second SRS resource set, where each of the first and the second lists of SRI to PUSCH power control mappings comprises an SRI ID and the PUSCH pathloss RS ID;

wherein the indication of which TRP the pathloss reference update refers to comprises:

a control message option where one control message updates both a first pathloss RS for a first set of SRI IDs associated to the first SRS resource set and a second pathloss RS for a second set of SRI IDs associated to the second SRS resource set.

13. The method of claim 12 wherein the control message comprises a Medium Access Control, MAC, Control Element, CE.

14. The method of claim 12, wherein control message comprises a Physical Uplink shared Channel, PUSCH, Pathloss Reference Signal, RS, identifier, ID, field indicating a first PUSCH pathloss RS ID.

15. The method of claim 12, wherein the control message also comprises one or more SRS Resource Indicator, SRI, Identifier, ID, fields, wherein each of the one or more SRI ID fields indicates an SRI ID.

16. A wireless device for identifying which Transmission and Reception Point, TRP, of a first and a second TRP an update refers to, the wireless device comprising one or more processors configured to cause the wireless device to:

receive a configuration of a first and a second Sounding Reference Signal, SRS, resource set, associated to the first and second TRPs, respectively;

receive a control message indicating a Physical Uplink Shared Channel, PUSCH, pathloss reference update associated to one of the first and second SRS resource sets;

where the control message comprises an indication of which one of the first and second TRPs the pathloss reference update refers to;

wherein the control message further comprises a bit field to indicate one of the first and the second SRS resource sets, wherein the one or more SRS Resource Indicator, SRI, identifier, ID, fields are associated with the one of the first and the second SRS resource sets;

wherein the one or more processors are further configured to cause the wireless device to receive a configuration of a first list of SRI to PUSCH power control mappings associated to the first SRS resource set and a second list of SRI to PUSCH power control mappings associated to the second SRS resource set, where each of the first and the second lists of SRI to PUSCH power control mappings comprises an SRI ID and the PUSCH pathloss RS ID;

wherein the indication of which TRP the pathloss reference update refers to comprises:

a control message option where one control message updates both a first pathloss RS for a first set of SRI IDs associated to the first SRS resource set and a second pathloss RS for a second set of SRI IDs associated to the second SRS resource set.

17. A base station for indicating which Transmission and Reception Point, TRP, of a first and second TRP an update refers to, the base station comprising one or more processors configured to cause the base station to:

transmit a configuration of a first and a second Sounding Reference Signal, SRS, resource set, associated to the first and second TRPs, respectively;

transmit a control message indicating a pathloss reference update associated to one of the first and second SRS resource sets;

where the control message comprises an indication of which one of the first and second TRPs the pathloss reference update refers to;

wherein the control message further comprises a bit field to indicate one of the first and the second SRS resource sets, wherein the one or more SRS Resource Indicator, SRI, identifier, ID, fields are associated with the one of the first and the second SRS resource sets;

wherein the one or more processors are further configured to cause the base station to transmit a configuration of a first list of SRI to Physical Uplink shared Channel, PUSCH, power control mappings associated to the first SRS resource set and a second list of SRI to PUSCH power control mappings associated to the second SRS resource set, where each of the first and the second lists of SRI to PUSCH power control mappings comprises an SRI ID and the PUSCH pathloss RS ID;

wherein the indication of which TRP the pathloss reference update refers to comprises:

a control message option where one control message updates both a first pathloss RS for a first set of SRI IDs associated to the first SRS resource set and a second pathloss RS for a second set of SRI IDs associated to the second SRS resource set.

* * * * *